(12) United States Patent
Kumar et al.

(10) Patent No.: US 7,785,397 B2
(45) Date of Patent: Aug. 31, 2010

(54) HIGHLY MICROPOROUS THERMOPLASTIC/BISMALEIMIDE SEMI-INTERPENETRATING POLYMER NETWORK

(75) Inventors: Ashwani Kumar, Ottawa (CA); Jamal Kurdi, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 448 days.

(21) Appl. No.: 11/885,873

(22) PCT Filed: Mar. 10, 2006

(86) PCT No.: PCT/CA2006/000348
§ 371 (c)(1),
(2), (4) Date: Sep. 7, 2007

(87) PCT Pub. No.: WO2006/094404
PCT Pub. Date: Sep. 14, 2006

(65) Prior Publication Data
US 2008/0134883 A1    Jun. 12, 2008

Related U.S. Application Data

(60) Provisional application No. 60/660,355, filed on Mar. 11, 2005.

(51) Int. Cl.
*B01D 53/22* (2006.01)
*B01D 71/06* (2006.01)

(52) U.S. Cl. .................... 95/51; 96/4; 96/13; 96/14; 95/45; 210/500.27; 210/500.28; 210/500.33; 525/417

(58) Field of Classification Search .......... 96/4, 96/12, 13, 14; 95/45, 51; 55/DIG. 5; 210/500.27, 210/500.28, 500.33, 500.41; 525/417
See application file for complete search history.

(56) References Cited

U.S. PATENT DOCUMENTS

| | | | | |
|---|---|---|---|---|
| 4,913,938 A | * | 4/1990 | Kawakami et al. | 427/383.1 |
| 5,035,802 A | * | 7/1991 | Yamasaki et al. | 210/490 |
| 5,643,390 A | * | 7/1997 | Don et al. | 156/307.1 |
| 5,667,881 A | * | 9/1997 | Rasmussen et al. | 442/179 |
| 5,770,676 A | * | 6/1998 | Pater et al. | 528/188 |
| 5,985,431 A | * | 11/1999 | Oosedo et al. | 428/297.4 |
| 7,226,702 B2 | * | 6/2007 | Oh et al. | 429/304 |

OTHER PUBLICATIONS

"New Semi-Interpenetrating Polymeric Networks From Linear Polysulfone and Thermosetting Bismaleimide and Polyaminobismaleimide Resins", Gaina et al., Polym.-Plast. Technol. Eng., 38(5), pp. 927-938, 1999.*
"Studies of the Stability of Thermoplastic-Modified Bismaleimide Resin", Mai et al., Journal of Applied Polymer Science, vol. 66, pp. 1965-1970, 1997.*
"New Semi-Interpenetrating Polymeric Networks From Linear Polysulfone and Thermosetting Bismaleimide and Polyaminobismaleimide Resins" Gaina, V. et al; Polym.-Plast. Technol. Eng. 38(5), 927-938 (1999).
"Noi materiale cu reŧele semi-interpenetrante pe bază de poliuretan Şi bismaleimide / poliaminobismaleimide" Viorica Găină, Constanti Găină Materiale Plastice 41, Nr :1 (2004).
"Studies of the Stability of Thermoplastic-Modified Bismaleimide Resin" Kancheng Mai;; Jianwei Huang; Hanmin Zeng; Journal of Applied Polymer Science, vol. 66, p. 1965-1970 (1997).
"Structuring and Characterization of a Novel Highly Microporous PEI/BMI Semi-interpenetrating {olymer Network" Jamal Kurdi; Ashwani Kumar, Polymer 46(18) p. 6910-6922, (2005).

* cited by examiner

*Primary Examiner*—Jason M Greene
(74) *Attorney, Agent, or Firm*—J. Wayne Anderson; Sonia Patenaude; Christine Piché

(57) ABSTRACT

In order to synthesize semi-interpenetrating polymer networks (semi-IPNs) with molecular sieve characteristics, polyetherimide/bismaleimide (PEI/BMI) chromophore composites were made through sol-gel technique. A tunable and compatible chemical structure with fine morphology was obtained through in situ controlled sol-gel polymerization, crosslinking, chemical modification and membrane fabrication. The novel semi-IPN, synthesized and assembled by using ethanol as polar protic modifier and pore former, had a superior structure and morphology suitable for making gas separation membranes. These semi-IPN membranes gave fifteen times higher gas flux without significant decrease in their gas permselectivity than membranes prepared from pure PEI. The chemical structures of these novel semi-IPNs were characterized by using FTIR, XPS and SEM. It was discovered for the first time that in situ simultaneous ethoxylation, anionic polymerization of BMI and imide modifications were responsible for creating the new chemical structure and molecular morphology that was different from traditional BMI resins. In addition to the superior structure, this chemical processes have the advantages of using simple green chemistry, ambient temperature and does not require initiators for polymerization.

20 Claims, 20 Drawing Sheets

HIGHLY MICROPOROUS THERMOPLASTIC/BISMALEIMIDE SEMI-INTERPENETRATING POLYMER NETWORK

This application is a National Stage application of PCT Application PCT/CA2006/000348 filed Mar. 10, 2006 which claims benefit of U.S. Provisional Application 60/660,355 filed Mar. 11, 2005.

BACKGROUND OF THE INVENTION

Membrane-based separation is a rapidly growing green technology that has been commercially recognized in many industrial applications. Most commercial asymmetric membranes are fabricated from engineering plastics using different techniques to obtain ideally ultra-thin skin layer having a high microporosity with molecular sieve characteristics. Additional requirements for membrane materials include ability to form flexible membranes, free of large defects, improved damage tolerance, stable and durable under operating conditions. Fulfillment of all these requirements is hard to achieve and improvement of membrane materials is still an important topic of research due to the trade off between permeability and selectivity that is usually a challenge especially in some applications such as separation of oxygen from air [1].

Generally, most of the polymers require incorporation of additives, whether inorganic or organic, to improve the processability, performance, durability and desired characteristics or properties which could not be obtained by only one pure polymer. Interpenetrating polymer networks (IPNs) were introduced in the early 1960s and led to a revolutionary success in creating polymeric nano-scale blends having new extraordinary properties as reviewed elsewhere [2,3]. The importance of IPN synthesis has been recognized through huge numbers of engineering literature, patents and commercialized products reported since 1951 [4]. The concept of in situ polymerization within and through structure of another polymer network as well as stabilizing this multi-phase system was based on creating interpenetrating (i.e. physical interlocked or/and catenated) networks having multi-domains at supramolecular levels. The concept of synthesis of IPNs seems to be useful for development of nano-size multiphase polymeric materials for gas separation membranes as it provides a distinct possibility to control composite material properties and morphology. However, in situ structuring and interfacial tailoring of IPNs is necessary to obtain desired properties and to overcome challenges such as defects in the fine structure [5], phase separation and incompatibility [6,7].

There are several routes for synthesis of IPNs with large topological variations. The chemical compositions of these IPNs can be selected from a variety of monomers, oligomers, prepolymers, polymers, crosslinkers and initiators as reported elsewhere [3,4]. It is pointed out that each specific application, requires a selection of the appropriate type of IPN, chemical composition and in situ synthetic procedures and processing including shaping and post-treatment of the final end-use products. For example, semi-IPN type polymer alloy was synthesized as a porous material to prepare microporous membranes as disclosed in a US patent [8]. This patent combines two known techniques of IPNs synthesis [3,4] and membrane formation [9] to introduce hydrophilic property into traditional asymmetric hydrophobic membranes. This patent reports using mono-functional vinyl monomer or/and oligomer containing a hydrophilic moiety and then making a strong connection for this monomer or/and oligomer to the hydrophobic non-crosslinked polymer through other multifunctional monomer or/and oligomer free of hydrophilic structure moiety. The advantages of hydrophilic surface of membranes are to improve the flux of water or other non-hydrophobic solvents as well as to make membranes fouling-resistant to hydrophobic solutes such as proteins. The application of the ultrafiltration membranes requires membranes with an average pore size diameter of 5.2 to 6 nm to separate more than 90% of Bovine Serum Albumin (BSA) solute that has a Stokes diameter of 7.74 nm as reported elsewhere [10]. The hydrophilic nature of these membranes and the relatively larger pore size than the molecular size of industrial gases such as nitrogen or oxygen makes these membranes not suitable for gas separation. It is also disclosed that a major disadvantage of their invention was that a very small flux was obtained for a low molecular weight cut-off membrane. It also appears that their route of IPN synthesis and formation of asymmetric membranes is unsuitable to prepare highly microporous gas separation membranes for the following reasons:

One of the ingredients of the casting solution in their invention could be alcohol such as ethanol, which acted as a solvent for non-crosslinked polymer.

In their invention, polymerization and gelation of the crosslinkable vinyl monomers or oligomers was accomplished after casting the film and subsequent irradiation by UV light, which was followed by coagulation in water. The presence of gel particles within the non-crosslinkable polymer solution may lead to a heterogeneous cast film that influences the dynamic of phase inversion process and asymmetric membrane morphology.

In their invention polymerization and gelation occurs in the absence of mixing.

In their invention, use of vinyl monomers requires initiators that results in additional cost, safety issues and contamination that may create large defects in the thin skin layer essential for membranes suitable for gaseous separations.

Other examples can be found in literature to prepare similar semi-IPN. In one of those examples, BMI/polysulfone semi-IPN was prepared from a casting solution of BMI, polysulfone and anionic initiator (1,4-diazabicyclo-[2,2,2]-octane) in N-methylpyrrolidone solvent. Thermal polymerization of BMI was achieved to gel the cast film. However, the morphology of the cured films examined by optical microscopy (magnification 1200 times) showed a phase separation [11]. It was attributed to heating the stagnant cast film at a high curing temperatures over glass transition temperature of PSF before and during polymerization of BMI that leads to this phase separation as illustrated elsewhere [12,13]. However, an improvement in the synthesis of semi-IPN was achieved in the work of Liou and coworkers [14] when BMI oligomer/polyimide was mixed in a rotary roller for 24 hours within a high viscous NMP/polyimide solution. BMI oligomers act as a plasticizer for polyimides and leads to formation of semi-IPNs containing microphase domains that are smaller than 0.25 micrometer, which is beyond the resolution limit of optical polarized microscopy [14]. However, the work was aimed to prepare semi-IPNs suitable for microelectronic industry.

SUMMARY OF THE INVENTION

The present invention involves structuring and enhancing the dispersion of the thermoset/thermoplastic semi-interpenetrating polymer networks (semi-IPNs) combined with appropriate membrane formation to provide a highly permeable and a homogeneous structure suitable for gas separation membranes. Following green chemistry approach, appropriate chemical modification and in situ polymerization of low cost thermoset BMI monomers within the structure of other thermoplastic PEI polymers, to fabricate novel PEI/BMI semi-IPNs with molecular sieve characteristics. The novel semi-IPN structure has been utilized to prepare gas separation membranes.

According to one aspect of the invention, polymerization of BMI takes place during mixing however it is terminated before the gelation leads to opaque solution, i.e. before any phase separation. Homogeneous well mixed solution was coagulated in water directly after casting. Coagulation and water phase inversion for the whole homogeneous structure are responsible for formation skinned asymmetric membranes.

Further, in our invention mixing for longer time is essential for polymerization and to make the unique structure responsible for superior characteristics.

In our invention polymerization takes place at room temperature without any initiators or catalysts.

DETAILED DESCRIPTION OF THE INVENTION

Experimental Part

Materials

Figure 1:
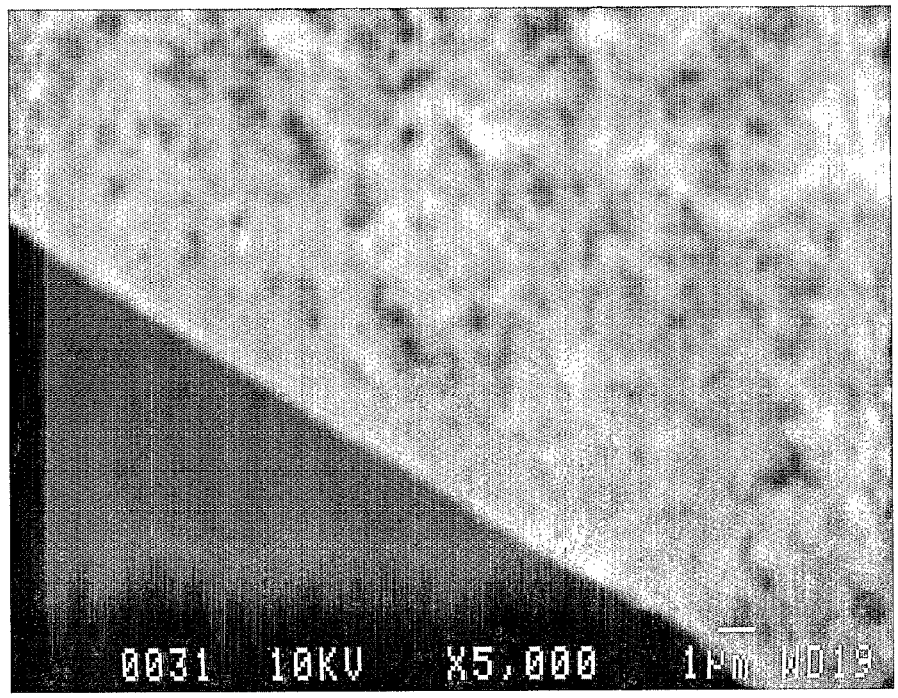
FIG. 1 is a micrograph of PEI-EtOH membrane obtained by SEM (X5000).

Aromatic polyetherimide (Ultem® 1000) was supplied by General Electric Plastics, USA in pellet form and was dried in an oven at 150° C. for 8 hours before use. Anhydrous 1-methyl-2-pyrrolidinone (Aldrich, 99.5%, reagent grade, water <0.005%), and 1,1'-(Methylenedi-4,1-phenylene) bismaleimide 95% were supplied by Sigma-Aldrich Canada Ltd. Anhydrous ethyl alcohol was received from Commercial Alcohols Inc., ON., Canada. Hexanes of ACS reagent grade were supplied by VWR, Canada. All solvents were used as supplied under a dry nitrogen atmosphere. Ultra high purity Helium and medical air were supplied by BOC Gases Canada Ltd and used as received without further purification.

Membrane Preparation

Samples of polyetherimide (PEI) with and without 1,1'-(Methylenedi-4,1-phenylene) bismaleimide (BMI) were prepared as flat asymmetric membranes by sol-gel technique. Polymerization of BMI monomer was carried out in polymeric solutions containing anhydrous 1-methyl-2-pyrrolidinone (NMP) as an aprotic dipolar solvent (other such solvents include dimethyacetamide, dimethylsulfoxide and dimethylformamide and ethyl alcohol (EtOH) as a mild polar nonsolvent and a proton donor. The PEI was selected because it provides a hydrophobic shield and acts as an ion stabilizer, i.e. as a catalyst for an electron transfer shuttle process [15]. Ethyl alcohol was selected to act as diluents for forming the porous structure and as a proton donor to enhance BMI polymerization. A BMI to PEI weight ratio in the range of 0.2 to 11% was used, since using a ratio higher than 11% usually leads to a brittle polymer networks. However, it has now been found that the range can be extended to 0.1 to 25% because we discovered later through additional experiments that using a higher polymer concentration allows to increase the BMI/PEI ratio to more than 11% without producing brittle membranes, particularly if the membranes are thick, which led to the formation of stronger membranes. The amount of the nonsolvent was kept at one-fifth of NMP weight so that the final solution was close to its clouding point [16]. Lower amounts of solvent are also possible and there is no restriction for the lower limit. Polymer solutions such as shown in Table 1 were prepared by mixing PEI and BMI in NMP. After PEI and BMI were completely dissolved, the non-solvent was mixed in this solution at ambient temperature and pressure. Mixing of these solutions was continued under ambient light for 30, 60 and 80 days. Additional experiments of mixing the solutions between ambient and 60° C. are in progress. To prepare membrane films, homogenous solutions with compositions such as shown in Table 1 were cast at room temperature on clean glass plates placed in a glove box equipped with a gas filter. After casting each sample with a doctor knife having a gap of 250 micrometer, the plate was quickly immersed in distilled water at ambient temperature. The membrane films were left in water for three days then washed and stored in an anhydrous EtOH bath for one day. Membranes were subsequently placed in hexanes for one day before leaving them in a fume hood for one day. Drying was carried out at 80° C. in air-purging convection oven for one day and finally in vacuum oven at 80° C. and 725 mm Hg vacuum pressure for two days. Three circular coupons of 7.4 cm diameter were cut from each sample to be used in the permeation test while other pieces were cut from the same cast membrane for characterization.

More specifically, the following procedures were used in the following order to prepare BMI/PEI-based semi-IPNs:

i. Ethoxylation, imide modification and BMI polymerization were done in one step (pot) in the immediate contact with PEI/NMP solution. Ambient conditions (such as temperature, pressure, light) were used. Mixing is necessary during this step to keep various components well-mixed and homogeneous. Partial formation of polyamic acid and/or protonated imide particularly at thermoset/thermoplastic interfaces enhances the compatibility between the two phases and probably reduces phase separation.

ii. Step i should be terminated well before liquid cloud point (changing from viscous clear liquid into cloudy liquid) is achieved. This cloudy point could be determined experimentally as it depends BMI polymerization time, polymer concentration in NMP (i.e. solution viscosity), BMI concentration, temperature, radiation energy, and others. Cloudy solutions indicate the formation of undesirable separated thermoset BMI macrodomains while it is necessary in semi-IPNs to form microdomains having nano-scale dimensions as reported elsewhere (Sperling, 1994; U.S. Pat. No. 6,228, 919). Termination of polymerization process was achieved after casting on a clean glass plate by coagulation and solidification of the composite networks (displacing solvent by non-solvent such as water, i.e. using phase inversion technique). The presence of macrodomains in the final membranes could be shown clearly by optical microscopy at magnification of 1000 times. The creation of macrodomains is an indication of phase separation of the two polymers.

iii. Liquid exchange from water (hydrophilic) to ethanol and then Hexanes was used before drying in order to preserve the membrane fine structure. Drying was carried out at 80° C. in air-purging convection oven for one day and finally in vacuum oven at 80° C. and 725 mm Hg vacuum pressure for two days.

TABLE 1

Compositions of polymeric solutions used in this study

| Samples | Composition, percent (w/w) of the total solution | | | | |
|---|---|---|---|---|---|
| | PEI | NMP | BMI | EtOH | i-PrOH |
| PEI-EtOH | 19.5 | 67.2 | 0 | 13.3 | 0 |
| PEI-BMI-EtOH | 17.6 | 67.2 | 1.9 | 13.3 | 0 |

Membranes used in the permeation test were coated with silicon rubber. A solution of 3% Sylgard 184 (with a catalyst to base rubber ratio of 1:10) in n-pentane was sprayed as a thin layer on the top surface of the membrane and the solvent was allowed to evaporate. Application of four coatings was found to be adequate for making a gas separation membrane. Finally, the coated silicon rubber was cured in air purging convection oven at 80° C. for one day.

Chemical Structure Analysis

Membrane samples without coating by rubber were examined by Scanning Electron Microscopy (SEM) using JEOL 840A equipment at an accelerating voltage of 10 kV. Samples were prepared by cutting a strip from membrane, freezing in liquid nitrogen and fracturing to obtain a representative sample. They were mounted on carbon tape on 45 degree SEM stubs and sputter coated with gold. Photographs were taken at a magnification of 5000.

Fourier Transform Infrared Attenuated Total Reflection (FTIR-ATR) analysis was performed using a SuperCharged ZnSe single-bounce ATR crystal with a tensor FT-IR spectrometer (Bruker IFS 66). The spectra were taken with 200 scans at a resolution of 4 cm$^{-1}$ in the range 400-2000 cm$^{-1}$.

For X-ray photoelectron spectroscopy (XPS) experiments, each sample was mounted on a piece of conductive carbon tape. The samples were analyzed, as received, using the Kratos AXIS Ultra XPS (X-ray photoelectron spectroscopy) equipped with a hemispherical analyzer, a DLD (delay line detector), charge neutralizer and a monochromatic Al K$_\alpha$ X-ray source. Analyses were performed using an accelerating voltage of 14 kV and a current of 10 mA. Survey scans were performed at a pass-energy of 160 eV. Species detected by survey scan were then analyzed at a pass-energy of 40 eV and quantified. The FTIR and XPS tests were carried out on all membrane samples before coating with silicon rubber.

Permeation Test

A cross-flow test cell having a permeation surface area of 21.2 cm$^2$ was used. Medical air was used at feed pressure of 665 kPa gauge (498.8 cm Hg) and the retentate was set at a flow rate of 6.6 ml (STP).s$^{-1}$. The permeate gas was discharged to atmosphere. The permeate flow rate was measured by a soap bubble flow meter and the oxygen concentration in the permeate gas was determined by gas chromatography.

Results and Discussion

Figure 2:
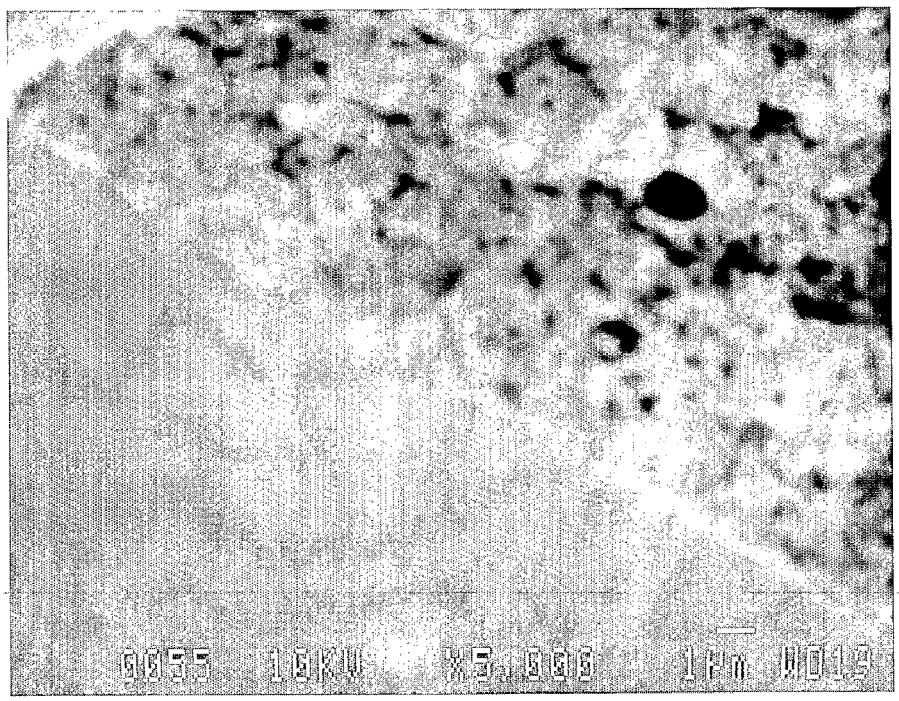
FIG. 2 is a micrograph of PEI-BMI-EtOH membranes casted after 60 days obtained by SEM (X5000).
Figure 3:
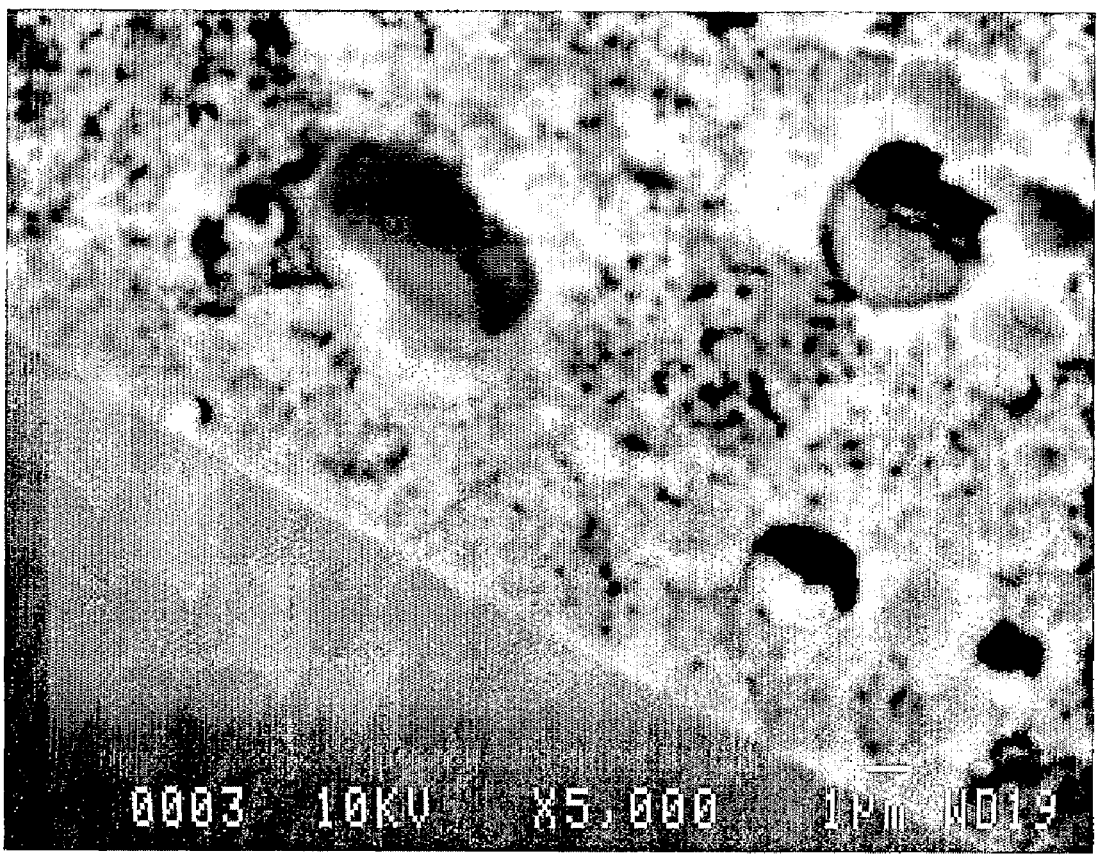
FIG. 3 is a micrograph of PEI-BMI-EtOH membranes casted after 80 days obtained by SEM (X5000).

Preliminary experiments were performed to explore and set appropriate experimental procedures. It was found that BMI undergoes a slow reactive substitution and/or self-polymerization at ambient temperature in the presence of both light and a proton donor (EtOH when it is incorporated into a dissolved glassy thermoplastic polymer having an electron acceptor group such as phthalimide e.g. PEI or sulfone in dipolar aprotic solvent such as NMP. This chemical process does not need complicated initiators for polymerization and have the advantage of using green chemical components such as EtOH, NMP, BMI and PEI. All experiments were done at ambient laboratory conditions. After preparing solutions with the above compositions, we noticed a change in color and viscosity of these polymeric solutions after a long period of time indicating that BMI, due to its reactivity, might be involved in some kind of reactions. When EtOH is used as a proton donor, the color of the polymeric solution undergoes gradual change from brown-yellow to a bright crimson color (bright bloody red color) accompanied with an increase in the observed viscosity of the solution. It takes 30 days to notice the change in the color and approximately 60 days to reach its brightest change and then the solution starts to be cloudy, less transparent with a decrease in the brightness and changing the color to a more brownish. Phase separation is clearly observed indicating the appearance of two polymer phases. The last phenomenon is well known in literature for the phase separation of thermoset/thermoplastic polymeric blends as illustrated elsewhere [13] and particularly for BMI/PEI blends [14]. This phase separation was observed by scanning electron microscope as shown in FIGS. 1, 2 and 3. It is clear from these figures that an increase in the size and number of cavities has taken place for membranes, which were formed from solutions with a longer polymerization time. The size of these approximately rounded cavities that appears partially filled by another solid phase exceeds 1 μm for membrane cast after 80 days. Usually this membrane is not suitable for gas separations due to the presence of cavities and particularly when ultra-thin skin asymmetric membranes were prepared as they are more prone to have these defects than thick flat films. We also found that mixing during polymerization of BMI has the advantage of maintaining homogeneous solutions. However, formation of air bubbles in these solutions should be avoided. The red color of the polymeric solution was attributed to a carbanion as discussed elsewhere when nano-crystalline titania was used as a catalyst to polymerize BMI [17]. This color also indicates the occurrence of anionic polymerization of BMI as reported elsewhere [18].

Additional experiments showed that the above process could be accelerated if temperature was increased to 50° C. or solution was irradiated with ultra-violet light. However, as the BMI polymerization process advanced slowly, it was possible to control the thermoset phase size and phase separation in the semi-IPNs by terminating polymerization growth at an appropriate stage. Stopping the polymerization and phase separation processes at different stages could be achieved by polymer coagulation through casting and membrane formation.

We also conducted similar experiments to perform BMI polymerization at ambient temperature in the presence of ethyl alcohol and light but in the absence of PEI. After 80 days, we did not observe any change in the BMI solutions indicating that PEI has an important catalysis role in BMI polymerization. As a first explanation, we suggest that phthalimide groups in PEI acts as a polymerization catalyst because these groups are excitable by light and may promote an electron transfer shuttle process [15]. The catalysis role of PEI could be similar to the role of nano-crystalline titania in catalytic anionic polymerization of BMI as reported elsewhere [17].

Additional experiments were conducted to polymerize BMI in PEI/NMP solutions but without using ethanol as a proton donor. After 80 days, no change in these solutions was observed indicating that ethanol plays a vital role in anionic polymerization of BMI. However, characterization of the chemical structure of the gelled network resulted from polymerization of BMI in PEI solution may provide more information about this chemical process as will be seen below. It is worth noting that the novel semi-IPN membranes formed in this invention showed an enhanced solvent resistance as they are partially soluble in chloroform while PEI is completely soluble in chloroform.

Chemical Structure Analysis

FTIR Analysis

Figure 4:
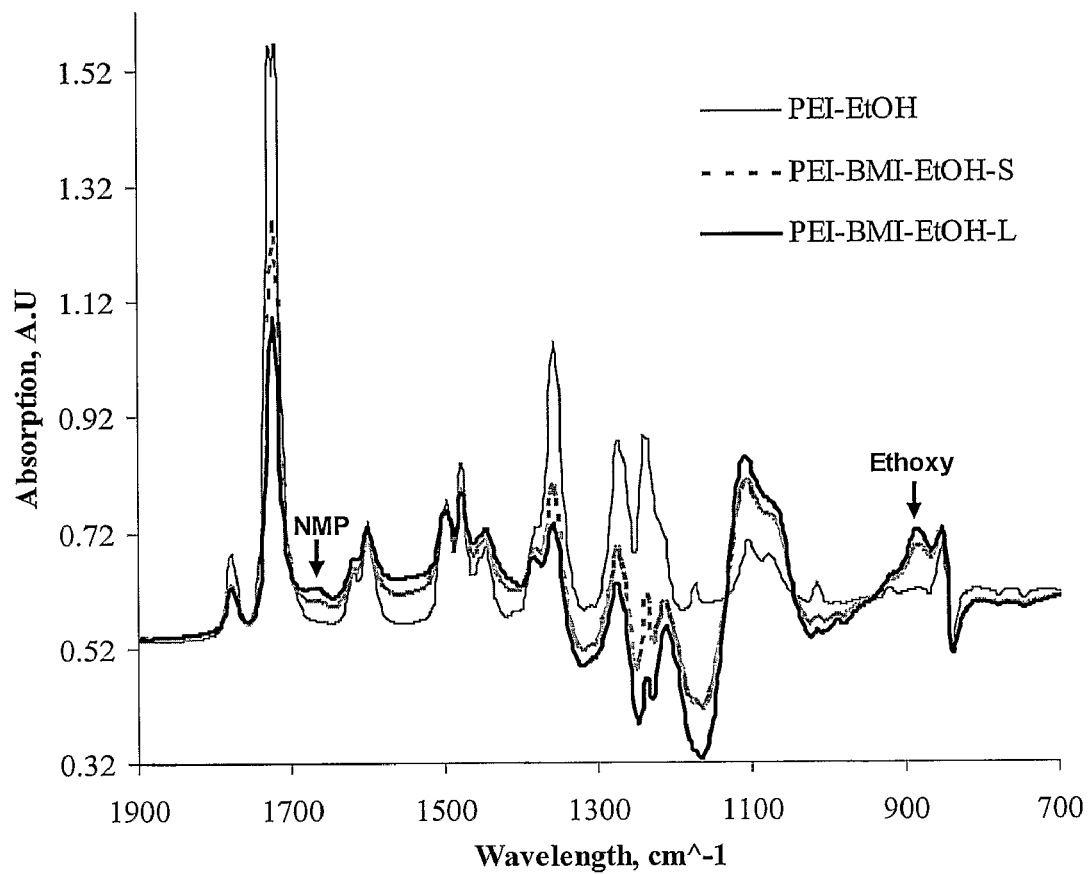
FIG. 4 are FTIR-Fingerprints spectra of PEI and PEI/BMI semi-IPN membranes.

Fourier Transform Infrared Attenuated Total Reflection (FTIR-ATR) spectra for PEI-EtOH, PEI-BMI-EtOH-S and PEI-BMI-EtOH-L membranes in the range of 600-2000 cm$^{-1}$ is shown in FIG. 4. The additional S and L symbols refer to solutions that were mixed for 30 and 60 days, respectively. Through data analysis, we considered the influences of incorporation of BMI or possible complexation with some of the used solvents on the spectra as each component has a different stoichiometric atomic concentration for each elemental chemical state (see Table 2).

TABLE 2

Stoichiometric atomic concentration of different elemental chemical states for different components

| | | | Theoretical atomic concentration | | | | | | |
|---|---|---|---|---|---|---|---|---|---|
| | | | Carbon atoms | | | | Oxygen atoms | | Nitrogen atoms |
| Component | Formula | Total atoms | CC, CH | CN, CO | OC=O NC=O | Ar C=C | carbonyl | Ether or OH | Imide or amide |
| PEI | C37 N2 O6 | 45 | 51.1 | 13.3 | 8.9 | 66.7 | 8.9 | 4.4 | 4.4 |
| BMI | C21 O4 N2 | 27 | 55.6 | 7.4 | 14.8 | 44.4 | 14.8 | 0 | 7.4 |
| NMP | C5 O1 N1 | 7 | 28.6 | 28.6 | 14.3 | 0 | 14.3 | 0 | 14.3 |
| EtOH | C2 O1 | 3 | 33.3 | 33.3 | 0 | 0 | 0 | 33.3 | 0 |

The new ethoxy group peak at 881 cm$^{-1}$ that was reported elsewhere [19] was also observed, which indicated a significant chemical reaction between EtOH and PEI-BMI network. It is worth noting that the ethoxy group has a high electron donating ability that may change the stability and properties of charge transfer complexes. The ethoxy group does not appear in the PEI-EtOH membrane suggesting that BMI has a major role in the oxa-Michael ethoxylation process and probably the ethoxy substitution occurred with the maleimide group accompanied by formation of amic acid resulted from imide cleavage as reported elsewhere [20]. The peaks at 1076 cm$^{-1}$ is assigned to imide ring deformation i.e. bending [14] as well as to symmetric aryl ether [21] and the peak at 1105 cm$^{-1}$ is assigned to p-phenylene CH in-plane bending [22].

According to del Arco and coworkers [23], the two peaks are formed upon dissociative adsorption of ethanol on acid-basic sites of the MgAlW/500 solid. These results suggest that additional substituted ethoxy groups or/and coordinated ethanol exist in the PEI-BMI-EtOH S and L membranes. This could be supported by the presence of the new observed ethoxy group band at 881 $cm^{-1}$ as discussed above.

As there is no significant increase in the peak intensity at 1150 $cm^{-1}$ for all membranes, it may suggest that vinyl groups in the maleimide moieties have completely reacted [14]. The shoulder peak at 1216 $cm^{-1}$ is assigned to C=O in-plane deformation [24]. As this shoulder becomes significant peak but at a lower level with a shift to a lower wavelength at 1211 $cm^{-1}$ that may be attributed to the formation of few amic acid groups that may form a complex with NMP [25]. The decrease in the wavelength might be due to the conversion of double bond into single bond, as the C—O stretching is usually located at 1205-1210 $cm^{-1}$ [26], which might have caused the observed shift. This can be supported by a similar shift observed for C=O stretch band upon complexation of the phenolic group to a metal [27]. The peak at 1240 $cm^{-1}$ is assigned to the asymmetric stretching in the diarylether [22]. The decrease in the intensity and the shift of this peak to 1236 for PEI-BMI-EtOH membrane may be due to coordination of aryl ether to proton found in amic acid group. This can be supported by the similar observation of Stoyanov [28] for the disappearance of IR ether peak (1120 $cm^{-1}$ in diethyl ether) upon proton solvation. We may suggest that ether has an important role in the abstraction of hydrogen from the proton-donor solvents.

The peak at 1407 $cm^{-1}$ is assigned to CH bending mode as in the ethoxy group [23] or in the $CH_2$ in NMP [14]. It may also be assigned to the symmetric $COO^-$ stretching [29]. The increase in intensity of this peak suggests the presence of ethoxy group, NMP or/and amic acid in the PEI-BMI-EtOH S and L membranes. The highest intensity was for PEI-BMI-EtOH-L membranes suggesting the largest imide cleavage, formation of amic acid groups and coordination to a relatively larger amount of NMP.

The Peak at 1618 $cm^{-1}$ is assigned to aromatic C=C stretch [24] and the increase in this peak is due to another additional contribution from the carbonyl stretch in the amic acid [30]. This also agrees with the increase in the absorption level between 1515 and 1570 $cm^{-1}$ that is assigned to N—H in-plane bending [22] attributed to the presence of amic acid in the PEI-BMI-BMI S and L membrane [14]. Again the highest intensity is for PEI-BMI-EtOH-L membranes suggesting a higher concentration of amic acid than all other membranes. The peak at 1670 $cm^{-1}$ is assigned to the carbonyl stretch in a complexed NMP [14]. This suggests that a residual NMP still exists in the PEI-EtOH-BMI S and L membranes. The complexation of the NMP with the amic acid as well as with the amide group was illustrated elsewhere [31]. The highest intensity for spectra of PEI-BMI-EtOH-L is due to the relatively largest coordination of NMP to the semi-interpenetrating polymer networks. This was also confirmed as mentioned above for the peak at 1407 $cm^{-1}$ attributed to $CH_2$ in NMP.

XPS Analysis

Figure 5:
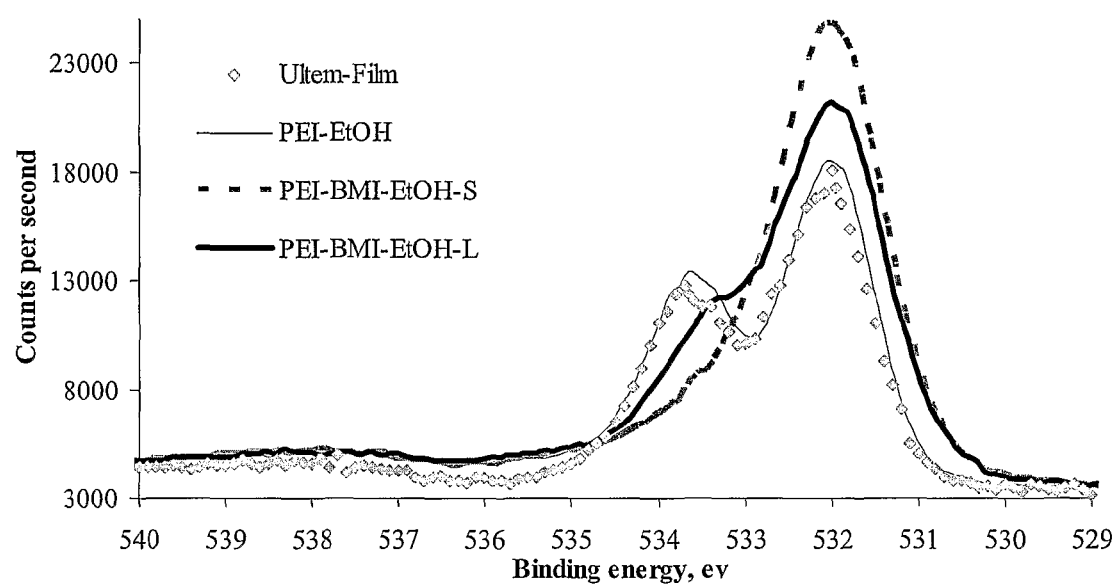
FIG. 5 are high resolution XPS core-level spectra of elemental oxygen for PEI and PEI/BMI semi-IPN membranes.
Figure 6:
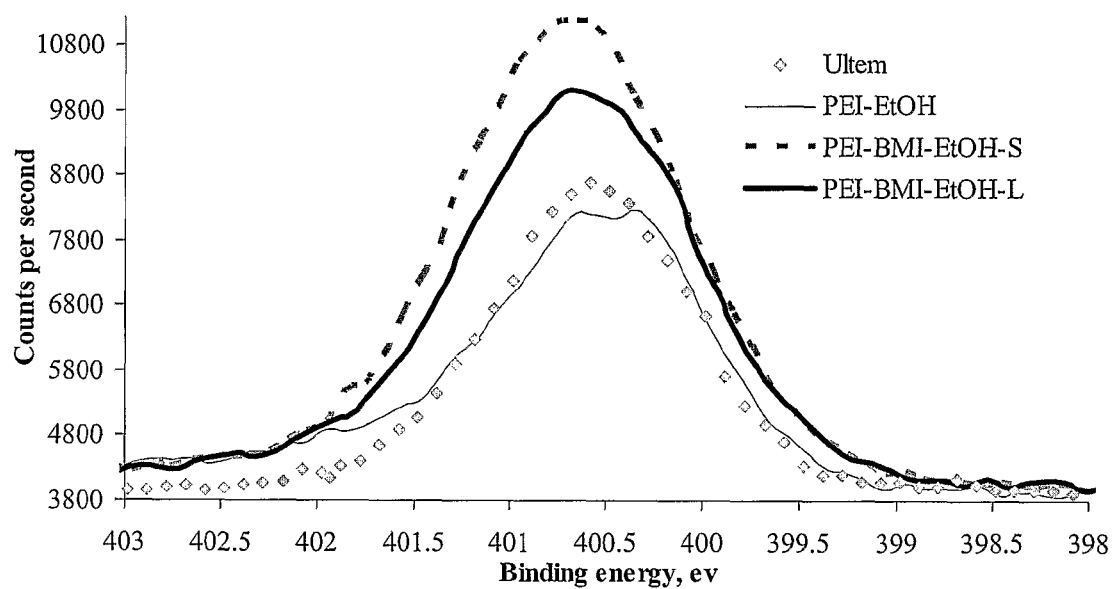
FIG. 6 are high resolution XPS core-level spectra of elemental nitrogen for PEI and PEI/BMI semi-IPN membranes.

The X-ray photoelectron spectroscopy (XPS) provides useful information about the chemical composition on the surface of membrane materials. The XPS core-level spectra for PEI-EtOH, PEI-BMI-EtOH-S and PEI-BMI-EtOH-L membranes are shown in FIGS. 5 and 6 for elemental oxygen and nitrogen, respectively. The spectral data for PEI (Ultem® 1000) film prepared from chloroform solution [32] were added in these Figs for comparison. The linear baselines were set to the same value for all spectra in each of the figures. The spectral data of PEI obtained from literature [32] were rescaled to be comparable with the spectral data obtained in this work. The total area of all peaks assigned for all elements for the XPS spectra of Ultem 1000 was scaled to have the same total area as in XPS spectra of PEI-EtOH membrane. We have also kept the same percentage ratio for the areas of the elemental carbon, oxygen and nitrogen as in literature [32]. Therefore these rescaled spectra can reproduce the same percentage atomic concentration of the assigned peaks exactly as in the source reference.

The core-level spectra of elemental oxygen are shown in FIG. 5. The main peak was assigned to carbonyl oxygen in the imide moiety and was set symmetrically at 532 ev for all spectra as found elsewhere [33]. Comparing the PEI-BMI-EtOH S and L membranes with PEI film, an increase in the intensity corresponding to binding energies between 530.5 ev and 532.4 ev. The contribution was generally from carbonyl groups and more specifically for peak at 531.5 ev was assigned to amide group [34]. Therefore, the increase of peak intensity in this range may be due to the incorporation of NMP into the material structure in addition to cleavage of some of imide groups that forms corresponding amic (amide and carboxylic) groups. The increase in the BE at 532.4 ev that is assigned to carbonyl oxygen in the carboxylic acid [35] is evidently for the cleavage of imide group and formation of amic acid in PEI-BMI-EtOH S and L. This observation provides corroborative proof for the observations discussed in the FTIR analysis.

The BE at 532 ev is assigned to carbonyl oxygen in imide moieties [33]. BMI has a higher imide concentration than PEI as shown in Table 2 that should increase the intensity of this imide peak as in the cases of spectra of PEI-BMI-EtOH S and L membranes. The spectra of PEI-EtOH have similar imide peak intensity suggesting the absence of NMP complexation with this membrane. The BE at 532.8 is assigned to oxygen in alkoxy group [36]. The intensity of this BE for PEI-EtOH membrane compared to PEI film does not change significantly while the increase in the intensity for PEI-BMI-EtOH (both S and L) indicates the presence of ethoxy groups in these membranes. This observation is corroborates the FTIR analysis presented in previous section.

The range of BE between 533.2-534.0 ev is attributed to oxygen in ether-like linkages [37]. The BE at 533.3 ev is assigned to oxygen in hydroxyl group or water [32,35]. The increase in the intensity at BE 533.3 ev that appears as a shoulder in the spectra of PEI-BMI-EtOH-L membranes suggests the presence of the hydroxyl oxygen attributed to the formation of polyamic acid. This shoulder had appeared in PEI-BMI-EtOH-L but not in PEI-BMI-EtOH-S membranes while both membranes have the same ingredients. This can be explained by the shift of this peak towards the imide oxygen peak due to negative charge of oxygen atom in the aromatic ether stabilized by a hydrogen bonding or cationic site. The overlap of the two oxygen peaks in the PEI-BMI-EtOH-S membranes leads to increase in the intensity of the original imide carbonyl oxygen peak in these membranes. The increase in intensity of the peak at 533.3 ev in the spectra of PEI-EtOH compared to the spectra of PEI film is attributed to possible coordination of this membrane to ethanol but not substitution with ethoxy group as is the case for PEI-BMI-EtOH S and L. The peak of aromatic ether is assigned at 533.7 ev as reported elsewhere [32,35]. The decrease in the intensity of the aromatic ether peak for membranes containing BMI is due to the absence of the ether group and the presence of carbonyl oxygen in the incorporated BMI. Additional decrease may also be attributed to the incorporation of NMP into the polymeric network. There is also the possibility of shift of this peak to a lower binding energy as discussed above. The above phenomenon of decrease in the binding energy of ether oxygen could also be supported by reported literature. For example the decrease in the binding energy of oxygen atom was attributed to an increase in the negative charge on this oxygen atom as illustrated elsewhere [38]. The formation of hydrogen bonding between proton on the carboxylate oxygen and the ether oxygen leads to develop and stabilize a negative charge on the ether oxygen [39]. From these reports, we may suggest that the additional decrease in the intensity of aromatic ether peak and its shift to lower BE are attributed to negative charge on ether oxygen with possible complexation with cations or protons especially for PEI-BMI-EtOH-S membranes.

The core-level spectra of elemental nitrogen are shown in FIG. 6. The main peak is assigned to imide nitrogen and was set symmetrically at 400.58 ev for all spectra as found elsewhere [40]. The binding energy in the range of 399.3-400.2 ev can be attributed to amide group as reported elsewhere [33, 40]. The increase in the intensity within this range for PEI-BMI-EtOH membranes suggests the formation of amide groups resulted from cleavage of imide groups. The binding energy between 400.4 and 401.1 ev is attributed to imide moieties as reported elsewhere [40]. The increase in the intensity of imide peak for PEI-BMI-EtOH is attributed to incorporation of BMI that contains higher stoichiometric imide concentration than PEI (see table 2). The complexation with NMP also leads to an increase in imide concentration for the same reason. The H-bonded or positively charged amines have binding energy at 401.7 ev [40]. The increase in the positive charge on nitrogen atom leads to a shift to a higher binding energies as discussed elsewhere [37]. The increase in peak intensity between 400.7 ev and 401.7 ev is due to the positive charge of the nitrogen atoms in both amide and imide groups that may also overlap with the un-charged ones. Therefore, we may suggests that the increased in the intensity of this peak particularly for the spectra of PEI-BMI-EtOH S and L membranes is attributed to positive charge on the imide or amide moieties with a higher positive charge for S membranes.

Formation of the BMI/PEI Semi-IPN

Results obtained from FTIR and XPS spectroscopy revealed that without BMI, not only alcohols interact with NMP solvents as reported in literature [16] but also interact with PEI that may influence the pore forming during phase inversion. It is suggested that coordinated alcohols are present in the fabricated PEI membranes that do not contain BMI in its structure. This agrees with reported results on the photo-reaction of methanol, ethanol or isopropanol with phathalimide by Roth and Hundeshagen [41]. Agreement between our results and literature revealed the presence of the interaction of alcohols with PEI especially under light excitation.

Based on the presence of ethoxy group in BMI resins as confirmed by FTIR and XPS in addition to the possibility of Oxa-Michael addition accompanied by imide cleavage as illustrated elsewhere [20] we propose a new mechanism for the formation of the novel semi-IPN structure. Anionic ethoxy group was substituted in the double bond in one of the maleimide terminal leading to the formation of carbanion and proton radicals that may cause initiation and polymerization of BMI as illustrated in Schemes 1 below:

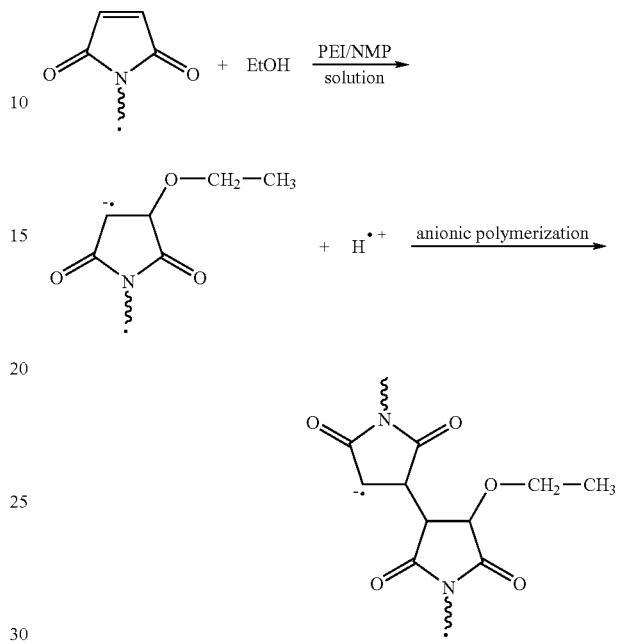

Scheme 1.
Shows ethoxylation reaction, formation of anionic and proton radicals and anionic polymerization of BMI, where ⁓ represents a connection to the rest of the molecule.

As seen in Scheme 1, substituent ethoxy occupies one of the two active sites in the maleimide double bond terminal leading to polymerize this terminal with another maleimide terminal instead of two terminals as the case of free radical polymerization of BMI as illustrated elsewhere [42]. This may lead to a decrease in the crosslinking density and therefore, we may expect that PEI-BMI semi-IPN formed by using EtOH has a lower density structure. It is worth noting that the combination of many chemical processes such as ethoxylation with in situ polymerization of BMI and imide chemical modification was the reason for the formation of new generation of BMI resins that may have lower density structure with improved permeation characteristics.

The imide cleavage has surprisingly happened within the conditions mentioned in this work upon using EtOH that may be attributed to generation of reactive byproduct probably proton or proton radical from ethoxylation of BMI as illustrated in Scheme 1. This imide chemical modification was reported in this work although according to literature, the cleavage of imide groups requires an alkaline medium [43] or oxidizing acids such as chromic acid and perchloric acid [44] or catalyst such as Amano PS [45]. As XPS results indicate the formation of positive charges on imide nitrogen particularly in PEI-BMI-EtOH-S membranes, it may suggest that the free proton or proton radical produced after ethoxylation process is responsible for the highest imide charging for PEI-BMI-EtOH-S membranes but lower imide charging for the PEI-BMI-EtOH-L membranes. The protonation of imide nitrogen lead to weaken the imide-carbonyl bond and therefore its cleavage. Electron transfer after cleavage from an anionic moiety may lead to neutralize of formed amic group found in PEI-BMI-EtOH-L membranes. We also found that NMP is complexed to the PEI-BMI-EtOH S and L membranes. The complexation or substitution of NMP into the new structure is similar to NMP complexation with polyamic acids as discussed elsewhere [31]. From the above discussion, we suggest that imide cleavage and NMP complexation could have occurred for imide group in PEI or BMI as shown in Scheme 2 below:

Scheme 2.
Shows imide cleavage that leads to formation of amic acid and then complexation with NMP, where ∿∿ represents a connection to the rest of the molecule.

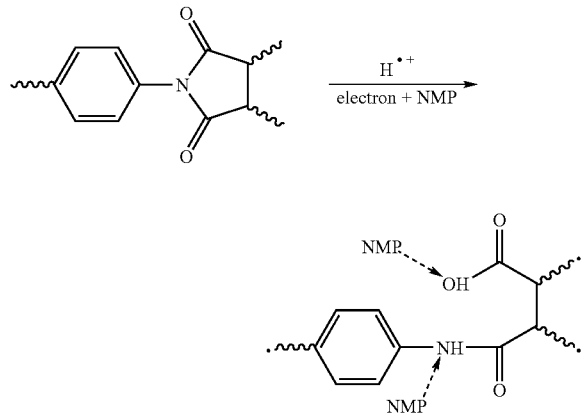

Therefore, we suggest a final structure for the novel semi-IPN material is a homogeneos blend of the combination of chemical structures shown in Scheme 3 below:

Scheme 3.
Shows the final combination of chemical structures that was suggested for PEI-BMI-EtOH (semi-IPN) membranes particularly at the interfaces, where ∿∿ represents a connection to the rest of the molecule.

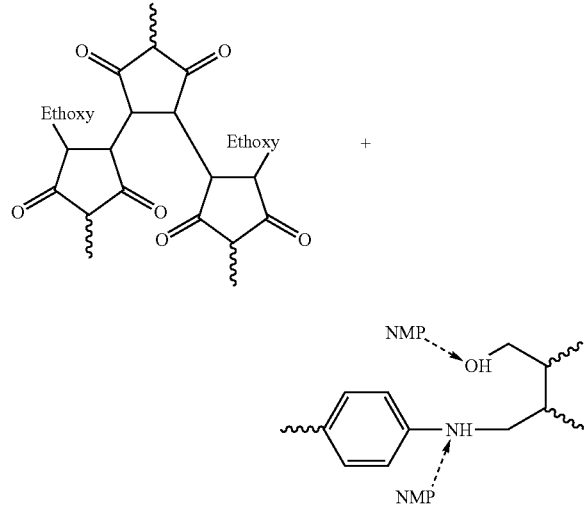

Gas Transport Characteristics

The fine morphology including sieving properties of the novel semi-IPNs was analyzed through gas permeation tests. Gas permeance and $O_2/N_2$ selectivity for separation of oxygen from air are shown in Table 3.

TABLE 3

Gas permeance vs $O_2/N_2$ selectivity for the separation of oxygen from air

| Membranes | Total Permeance GPU[a] | Oxygen Permeance GPU[a] | Selectivity $O_2/N_2$ |
|---|---|---|---|
| PEI-EtOH | 16.7 | 11.5 | 2.3 |
| PEI-BMI-EtOH-S[b] | 61.6 | 42.4 | 2.2 |
| PEI-BMI-EtOH-L[b] | 248.8 | 167.0 | 2.1 |
| Composite membrane, Ref. [47] | – | 33.2 | 4.3 |
| Composite membrane dried for 30 sec, Ref. [48] | – | 266-826 | 2.0-2.1 |
| Composite membrane dried for 70 sec, Ref. [48] | – | 143-334 | 2.2-2.3 |

[a]Gas Permeation Unit, $GPU = 1 \times 10^{-6} \frac{cm^3 \, (STP)}{cm^2 \, sec \, cm \, Hg}$

[b]S and L symbols refer to solutions that were mixed for 30 and 60 days, respectively.

It is clear that the developed BMI/PEI semi-IPN prepared using ethanol has the highest permeance 248.8 GPU than all other structured materials. Although permeance was increased by approximately 15 times over the PEI-EtOH membranes, the $O_2/N_2$ selectivity remained same. The increase in gas permeance could be attributed to the increase in the free volume or pore number in membrane materials resulted from ethoxylation process as discussed above or an increase in pore size. Because the $O_2/N_2$ selectivity was not decreased, presence of larger pores was ruled out. Another possibility for increasing gas permeance could be a decrease in the thickness of membrane skin due to different material properties that influence the dynamic of membrane phase inversion. In any possible case, the outcome performance suggests that the novel BMI/PEI semi-IPN is a very promising polymeric material suitable for preparation of gas separation membranes. Comparing the performance of these novel membranes with reported patents, it is clear that obtaining high $O_2/N_2$ selectivity of 4.3, the oxygen permeance would not exceed 34 GPU as reported elsewhere [46]. Although we used the old Sylgard 184 silicon rubber coating technique [47], the BMI/PEI semi-IPN membrane showed air separation performance that was comparable to a recent patent [48], which aimed to develop the coating technique but not the membrane materials. It was also noticed that the gas permeances of the developed membranes reported elsewhere [48] drops significantly when drying time was increased from 30 seconds to 75 seconds. It is not clear from this patent if the drying for longer time will make the membrane less useful or if an additional drying is required to have stable membranes. The BMI/PEI semi-IPN according to the invention was tested again for air separation after one month and showed the same performance indicating reasonable good stability.

It was concluded that BMI/PEI semi-IPN membranes could be synthesized and assembled through in situ polymerization of BMI inside PEI solutions. EtOH and PEI have important roles to catalyze and accelerate anionic polymerization of BMI at ambient temperature without the use of an initiator. It was clear that simultaneous ethoxylation, imide cleavage, NMP complexation and anionic polymerization of BMI lead to formation of a novel semi-IPN structure. It was shown that (in contrast to the U.S. Pat. No. 6,319,404) avoiding phase separation before coagulation is a factor to produce novel materials for gas separation membranes. Mixing during polymerization of BMI provides better dispersion. It was also concluded that oxa-Michael ethoxylation of one terminal maleimide group prevents from polymerization of this terminal with two other maleimide terminals and therefore decreasing the formation of high dense thermoset BMI resins that makes it brittle. The PEI-BMI-EtOH-L prepared in this work has 15 times higher permeance than membranes prepared from pure PEI without any significant decrease in the selectivity for separation of oxygen from air.

Further Experimental

Materials ambient condition. A second group of samples was rolled inside a cabinet that fitted with three infra-red lamps (375 Watt) with adjustable intensity to control the temperature. In our experiments, it was maintained at 60° C. The change in color of each sample was monitored and all solutions were cast at different mixing times. Membranes were cast at room temperature on clean glass plates placed in a glove box equipped with a gas filter. After casting each sample with a doctor knife having a gap of 250 micrometers, the plate was quickly immersed in distilled water at ambient temperature. The membrane films were left in water for three days then

TABLE 4

Chemical structure of PEI, BMI and NMP

| Component | Chemical structure |
|---|---|
| PEI | [structure of PEI] |
| BMI | [structure of BMI] |
| NMP | [structure of NMP] |

Membrane Preparation

Casting solutions with various compositions listed in Table 5 were prepared.

TABLE 5

Compositions of polymeric solutions used in this study

| Sample No. | Composition, percent (w/w) of the total solution | | | |
|---|---|---|---|---|
| | PEI | BMI | NMP | EtOH |
| 1 | 25 | 0 | 62.35 | 12.65 |
| 2 | 24.75 | 0.25 | 62.35 | 12.65 |
| 3 | 23.75 | 1.25 | 62.35 | 12.65 |
| 4 | 22.5 | 2.5 | 62.35 | 12.65 |
| 5 | 29 | 0 | 60 | 11 |
| 6 | 28.71 | 0.29 | 60 | 11 |
| 7 | 27.55 | 1.45 | 60 | 11 |
| 8 | 26.1 | 2.9 | 60 | 11 |

PEI was completely dissolved in NMP solvent by rolling the bottle of each sample slowly then, anhydrous EtOH was added with slow mixing until a homogenous solution was obtained. It was possible to reduce the required time for this process by increasing temperature to 60° C. BMI powder was added to some of these casting solutions (see Table 5) and slow mixing was carried out for one group of samples at washed and stored in anhydrous EtOH bath for one day. Membranes were subsequently placed in hexanes for one day before leaving them in a fume hood for one day. Drying was carried out at 80° C. in air-purging convection oven for one day and finally in vacuum oven at 80° C. and 725 mm Hg pressure for two days. Three circular coupons of 7.4 cm diameter were cut from each sample to be used in the permeation test while other pieces were cut from the same sample for SEM characterization.

Membranes used in the permeation test were coated with silicon rubber. A solution of 3% Sylgard 184 with a catalyst to base rubber ratio of 1:10 in n-pentane was sprayed as a thin layer on the top surface of the membrane and the solvent was allowed to evaporate. Application of four coatings was found to be adequate for making gas separation membranes. Finally, the silicon coated membranes were cured in air purging convection oven at 80° C. for one day.

Membrane Morphology

Membrane samples without silicon rubber coating were examined by Scanning Electron Microscope (SEM) using JEOL 840A equipment at an accelerating voltage of 10 kV. Samples were prepared by cutting a strip from membrane, freezing in liquid nitrogen and fracturing to obtain a representative sample. They were mounted on carbon tape on 45 degree SEM stubs and sputter coated with gold. Photographs were taken at different magnifications.

Permeation Test

A cross-flow test cell having a permeation surface area of 9.6 cm$^2$ was used. Pure $O_2$, $N_2$ and medical air were used to study $O_2/N_2$ separation. Pure $CH_4$, $CO_2$, $N_2$ and their mixture were used to study $CO_2/CH_4$ and $CO_2/N_2$ separations. Feed pressure of 665 kPa gauge (498.8 cm Hg) was used and the retentate was set at a flow rate of 6.6 ml (STP).s$^{-1}$ while permeate was discharged to atmosphere. The permeate flow rate was measured by a soap bubble flow meter while for mixtures $O_2$ and $CO_2$ concentrations of permeate were determined by gas chromatography.

Results and Discussion

Synthesis procedure for PEI-BMI semi-IPNs combined with membrane formation was arrived at after several preliminary experiments. It was observed that BMI could be polymerized slowly inside and through PEI/NMP solutions at ambient conditions in the presence of Ethyl alcohol as a proton donor [49-51]. This in situ anionic polymerization of BMI has many advantages such as avoiding the addition of complicated initiators or catalysts as well as obtaining low molecular weight thermosetting polymer as discussed elsewhere [18]. Using EtOH as a proton donor, the color of the PEI-BMI polymeric solution underwent gradual change from light yellow to bright crimson. It was worth noting that the polymerization rate of BMI depends on the transparency of the used bottle, the speed of mixing, the intensity of light, temperature, composition and concentration of the polymer solution. Absorption of water vapor during preparation of the solution might also have an influence on the rate of BMI polymerization. For our samples we observed that at room temperature, under ambient light the solution need from 11 to 24 days for onset of color change while at 60° C., color changed in less than 24 hours. In the previous works it was noted as 30-80 days however, it has now been found that from 11 to 24 days under ambient light is more precise because we kept the light on at night while, this was not done during our original experiments. The fact remains that the signal for avoiding phase separation of the two polymers is formation of an opaque solution and that this can be up to 80 days, depending upon conditions. It was observed that color change was faster for transparent bottles, more intense light, lower BMI concentration, lower viscosity and higher speed of mixing. Appearance of dark red color is an indication for complete polymerization of BMI to a low molecular weight resin and mixing for longer time did not lead to a significant change in the solution. This is due to anionic polymerization of BMI that usually led to a low molecular weight polymer as discussed elsewhere [18]. All polymer solutions were suitable for producing gas separation membranes as long as there is no large phase separation or precipitation.

Morphology Analysis

Figure 7A:
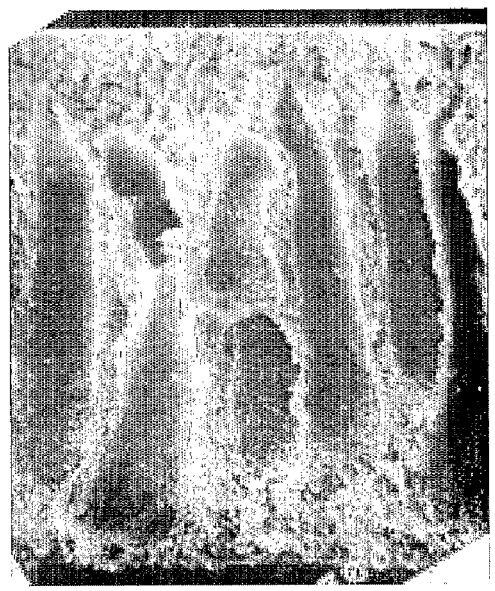
FIG. 7 are SEMS comparing morphologies of membranes produced from casting solutions containing 29% polymer concentration (a) and 19.5% polymer concentration (b). SEM at the same magnification 500 with the same scale distance.
Figure 7B:
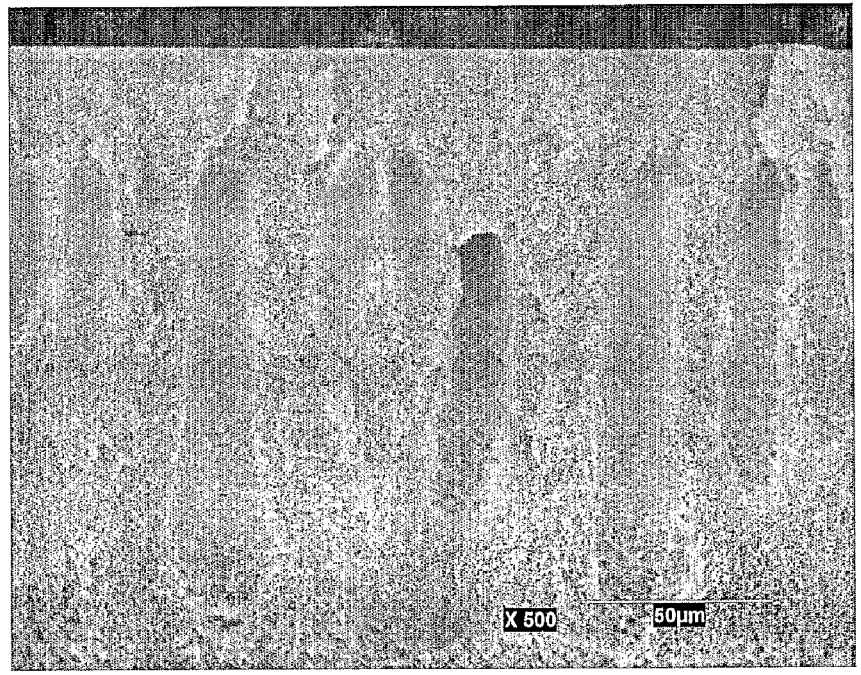

Membrane morphology correlated to membrane preparation plays an important role in determining membrane performance for gas separations. Therefore, membranes were examined by scanning electron microscopy (SEM) to show the change in the morphology that might influence the performance of gas separation membranes. As shown in FIG. 7, membranes labeled (a) that produced from casting solution containing 25 (wt) % polymer (PEI+BMI) apparent thickness of 170.5 μm and membranes labeled (b) that were made from a solution containing 19.5 (wt) % polymer have an apparent thickness of 148 μm. This means that the shrinkage of membrane (a) due to coagulation is higher that lead to a thinner structure and larger number of fingers (see FIG. 7) than those in membrane b. For quantitative comparison of the differences between these two membranes (a and b), additional measurements and calculations were done. The weights of these dried membranes (a and b) with area of 16 cm$^2$ were determined by Sartorius balance (least count 0.0001 g). The density of two polymer solutions used to produce the above mentioned membranes (a and b) were determined using the same Sartorius balance and 100 ml volumetric flasks with class A glass stopper. For area of 16 cm$^2$, the weight of the used solution was calculated form the corresponding polymer concentration and the net polymer weight; and then the volume of solution was calculated from its weight and density. The thickness of the solution was calculated from its volume and area (i.e. 16 cm$^2$). The apparent density of the two membranes was calculated by divided membrane weight by its apparent volume. The results are shown in Table 6.

TABLE 6

Apparent volume$^f$ and thickness of two membranes (a and b) as well as for their corresponding solutions, which have 19.5% and 29% (w/w) respectively. Apparent density of these two dried membranes was also calculated.

| Sample | Area cm$^2$ | Polymer Conc. % | Polymer Weight$^f$ g | Solution Density g/cm$^3$ | Thickness cm | Apparent Volume$^f$ cm$^3$ | Apparent Density g/cm$^3$ |
|---|---|---|---|---|---|---|---|
| Solution (a) | 16 | 19.5 | 0.0785 | 1.0066$^d$ | 0.02500$^e$ | 0.3999 | — |
| Solution (b) | 16 | 25 | 0.1227 | 1.0100$^d$ | 0.03037$^e$ | 0.4859 | — |
| Membranes (a) | 16 | — | 0.0785 | — | 0.01480$^c$ | 0.2368 | 0.3315 |
| Membranes (b) | 16 | — | 0.1227 | — | 0.01705$^c$ | 0.2728 | 0.4498 |

$^c$measured by SEM,
$^d$measured,
$^e$calculated,
$^f$corresponding to 16 cm$^2$ area.

It is clear that the apparent density of membrane (a) is lower than that for membrane (b) by 26% and the total thickness is reduced by 13%. Although we used same doctor blade (gap of 250 μm), the thickness of membrane cast with solution (b) has to be 303.7 μm in order to produce 16 cm$^2$ dried membrane that weighs 0.1227 g. This means that a swelling of the more viscous solution (b) took place during casting process that was similar to die swell as illustrated elsewhere [52]. According to Ismail and Hassan, 2006, the shear rate is a function of the velocity of casting knife and membrane thickness [53]. Therefore, the shear rate that influence membrane morphology and performance as discussed elsewhere [52, 54] was not the same for the two membranes when the same speed of casting knife is used. It is worth noting that the skin layer thickness of the two membranes was difficult to be distinguished.

Figures 8A, 8B:
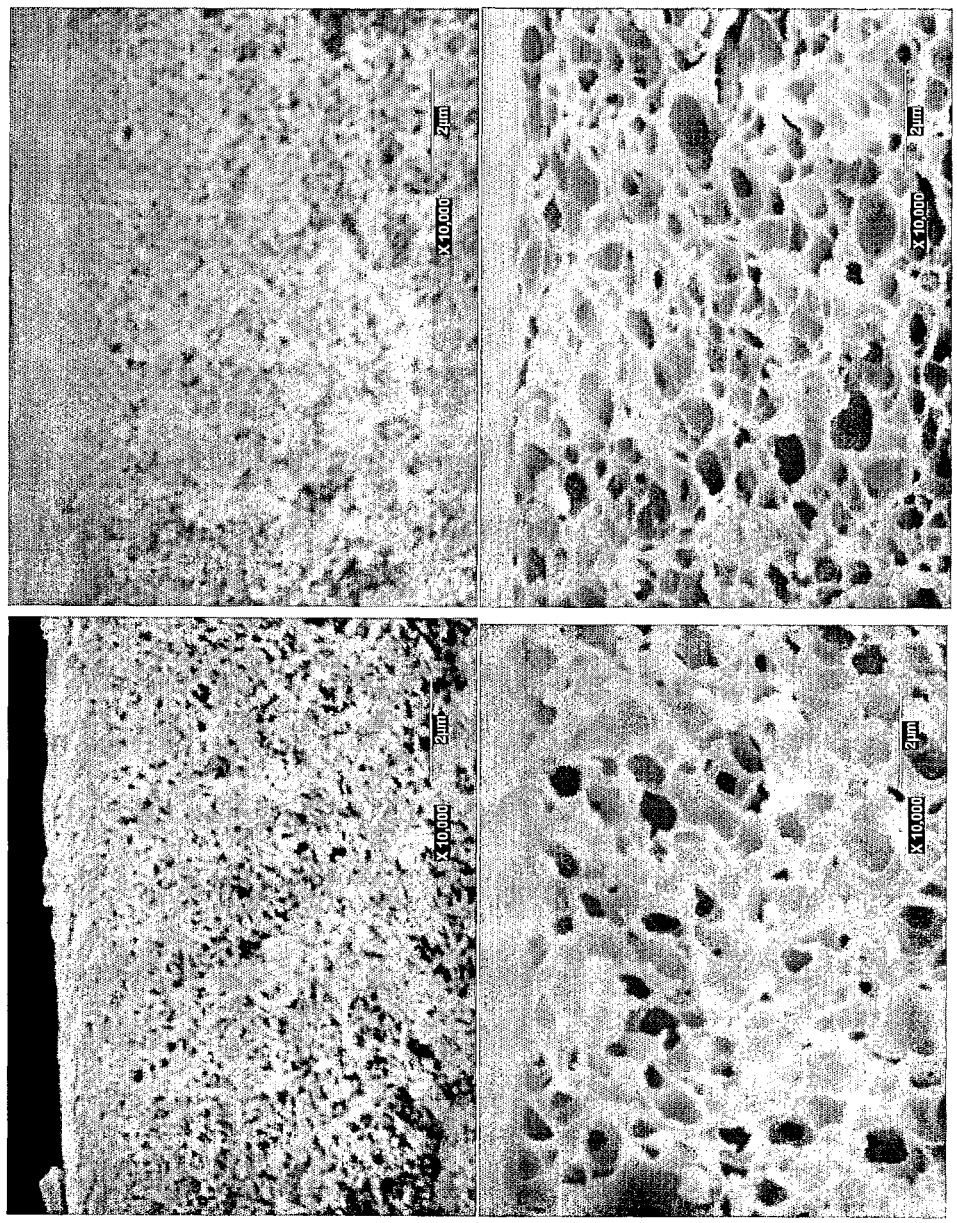
FIG. 8 are cross-section SEM of membranes produced from casting solutions containing 29% polymer concentration (a) and 19.5% polymer concentration (b). The two top monographs represent the top layer of the membrane and the two bottom monographs represent the bottom layer of the membrane.

Spongy structure of these membranes might also be influenced by solution compositions and gellation conditions as discussed elsewhere [55]. FIG. 8 shows the top and bottom parts of the cross-sections of membranes (a) and (b). It is clear that the cross-section of the top skin layer membrane (a) has a higher porosity than membrane (b). Also the cross-section of bottom spongy layer has a higher porosity than the top skin layer for both membranes. This increase in the spongy pore size especially for the bottom layer can be attributed to increase the amount of solvent (NMP) in the coagulation medium (water). The same phenomenon was observed elsewhere (Silvestri et al. 2005-83-92) [56].

Regardless of the used membrane materials, the above morphology observations indicate that membrane preparation procedures play an important role in determination of the size, shape and distribution of pore or free volume. Generally, solution containing a high polymer concentration (usually more than 25% (w/w) of polymer e.g. 25-35% (w/w) of polymer) might produce membranes with a tighter structure and lower free volume compared to membranes produced from solutions containing a lower polymer concentration e.g. 19 to 19.5%. The tighter morphology leads to membranes with a low fluid flux and high interactions between the fluid and membrane materials that might lead to an improved fluid permselectivity. The less tight morphology leads to an opposite influence on the fluid flux and permselectivity. Therefore various membranes could be produced from the same materials that have varying morphology with a trade-off between membrane permeance and permselectivity. This trade-off, which is related to membrane morphology resulted from using different preparation method, such as polymer concentration, BMI/thermoplastic ratio, membrane thickness and shear rate during membrane casting e.g. see morphology analysis in paragraph [0048] above, and FIG. 7 shows membranes with different thickness and polymer concentrations is different from the Robeson's trade-off that is used to compare different membrane materials but not different membrane morphology. The ability to tailor these membranes and control their morphology has been reported elsewhere [57-58].

Gas Transport Characteristics

Air Separation

Figure 9:
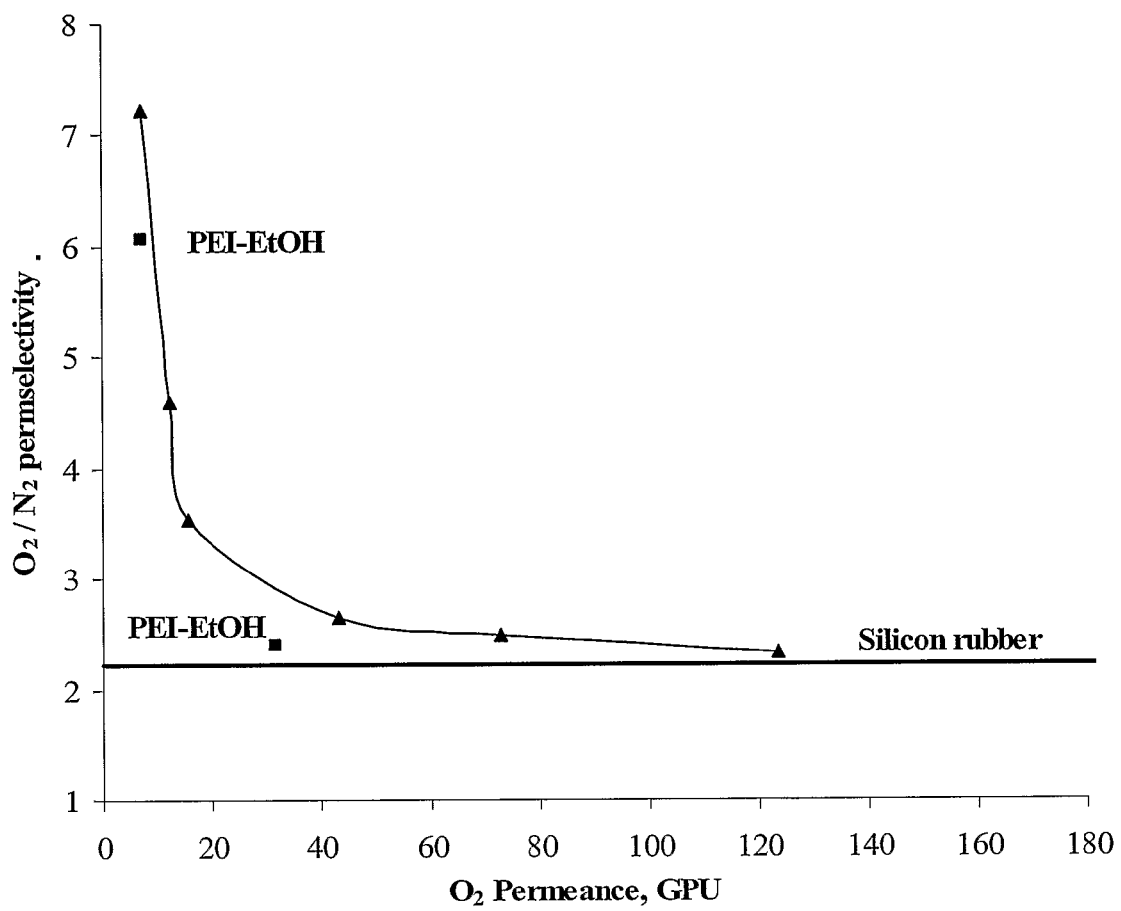
FIG. 9 is a graph illustrating the trade-off curve plot of $O_2$ permeance and $O_2/N_2$ permselectivity based on the permeation of pure gases, square markers are for PEI membranes without BMI.

Semi-IPN PEI-BMI membranes were tested through permeation of pure oxygen and nitrogen as well as for air. FIG. 9 shows the trade-off curve plot of $O_2/N_2$ permselectivity versus $O_2$ permeance based on permeation of pure gases. As we have discussed in the morphology analysis section, it is possible to control membrane morphology and its apparent density through changing the preparation procedures. Although FIG. 9 shows the decrease in the $O_2/N_2$ permselectivity with an increase in the $O_2$ permeance, the rate of these changes is not constant and might be divided into two regions. The first region represent permeance ranging up to 30 GPU where there is a steep decrease in the $O_2/N_2$ permselectivity with a slight increase in the $O_2$ permeance. In this region, the dominant interactions are between the permeable gases and the semi-IPN PEI-BMI networks. The improvement in the $O_2/N_2$ permselectivity might be attributed to membrane skin integrity that could be explained by the polymer chain orientation and gradual change in the microscopic porosity through the cross-section of the membrane skin. As there is a slight change in the gas permeance, it is possible that the denser of the top surface of the skin layer is accompanied with a less dense structure for the rest of the skin (transition layer) and vice versa. As we were not able to make PEI membranes with $O_2/N_2$ permselectivity equal or greater than 7, it was possible to make semi-IPN PEI-BMI membranes with $O_2/N_2$ permselectivity of slightly larger than 7. This indicates that the new membrane material has ability to form better membrane skin integrity than using PEI alone as a membrane material. Therefore, both procedures for membrane preparation in addition to membrane material characteristics are of great importance for improving performance of gas separation membranes. For example, through preparation of asymmetric polysulfone nanofiltration membranes, it was observed by Ismail and Hassan (2006) that decreasing the polymer concentration or increasing the shear rate (up to a critical shear rate) leads to an increase in the pure water permeation but a decrease in the percentage of salt rejection [53]. A similar observation on the influence of shear rate during membrane preparation on membrane performance for $CO_2/CH_4$ separation was also illustrated and reported elsewhere [54].

In the second region, there is a slight decrease in the $O_2/N_2$ permselectivity with the increase in the $O_2$ permeance from 30 GPU and up. This permselectivity is close to the intrinsic $O_2/N_2$ permselectivity for silicon rubber (i.e. $\alpha=2.22$) that was coated on the membrane. It is clear that the interactions in this region are dominant between the permeable gases and the coated silicon rubber. The large increase in the gas permeance is attributed to the decrease in the gas transport resistance of the supported layer (i.e. semi-IPN PEI-BMI membrane). However, there is a limitation for the increase in the gas permeance by the increase in the free volume of the supported layer that might lead to a decrease in its mechanical strength or creating large defects. As reported by Koros and his coworkers that these defects should be small enough in order to have the ability to caulk the membrane skin with silicon rubber and eliminate the Knudsen flow through these defects that deteriorate membrane gas permselectivity [52].

Figure 10:
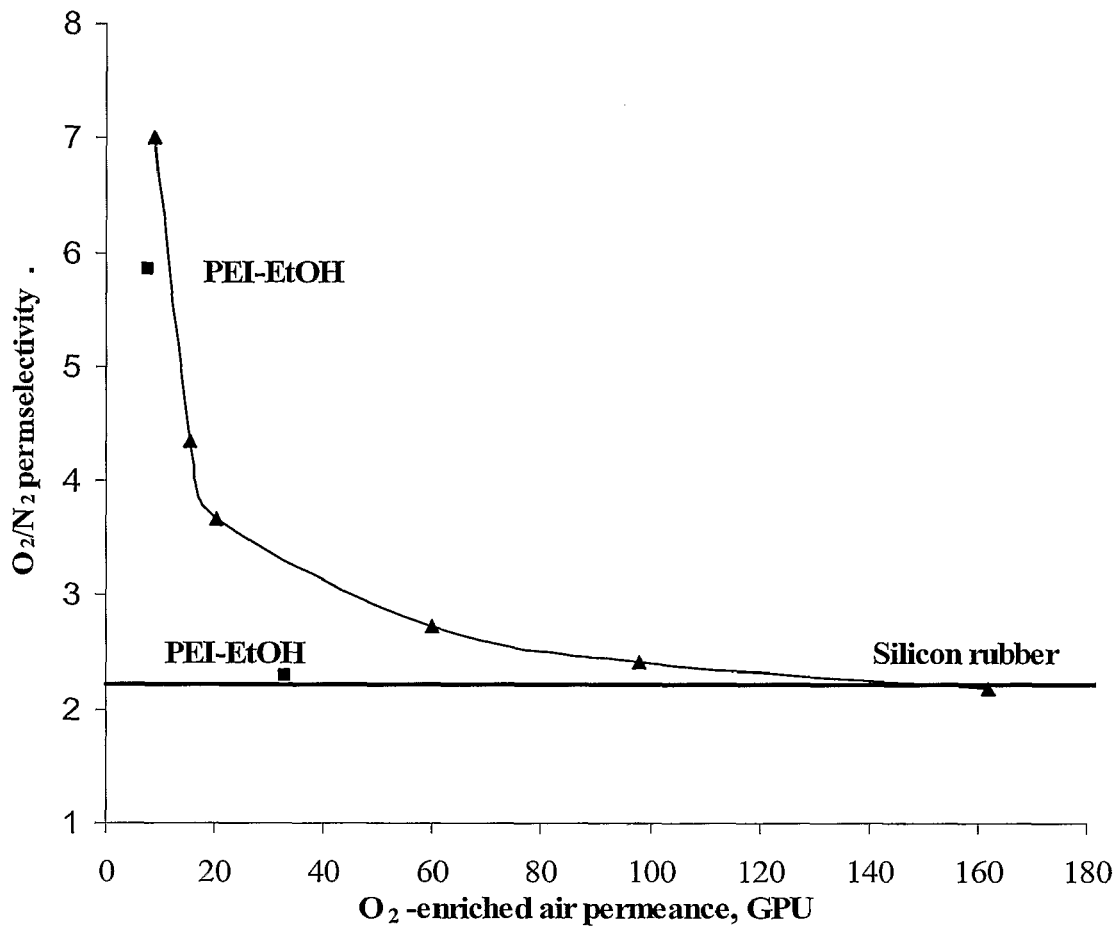
FIG. 10 is a graph illustrating the trade-off curve plot of $O_2$-enriched air permeance and $O_2/N_2$ permselectivity based on the permeation of air, square markers are for PEI membranes without BMI.

As for pure gases (see FIG. 9), we have also observed the same trade-off curve between $O_2/N_2$ permselectivity and $O_2$-enriched air permeance as shown in FIG. 10 based on the permeation of air as a feed gas. It was worth noting that the semi-IPN PEI-BMI membranes has an improved performance for $O_2/N_2$ separation compared to PEI membranes without BMI. This might be attributed to improved membrane skin integrity that lead to a high $O_2/N_2$ permselectivity with slightly higher gas permeance. It was further observed that membrane labeled b in this work have $O_2$-enriched air permeance of 9 GPU and $O_2/N_2$ permselectivity of 7. Conversely we observed an increase in the gas permeance due to a decrease in the gas transport resistance of the membranes without formation of defects, which are not small enough to be caulked by the silicon rubber. For example membrane labeled (a) in this work have $O_2$-enriched air permeance of more than 150 GPU and $O_2/N_2$ permselectivity of 2.2.

$CO_2/CH_4$ Separation

Figure 11:
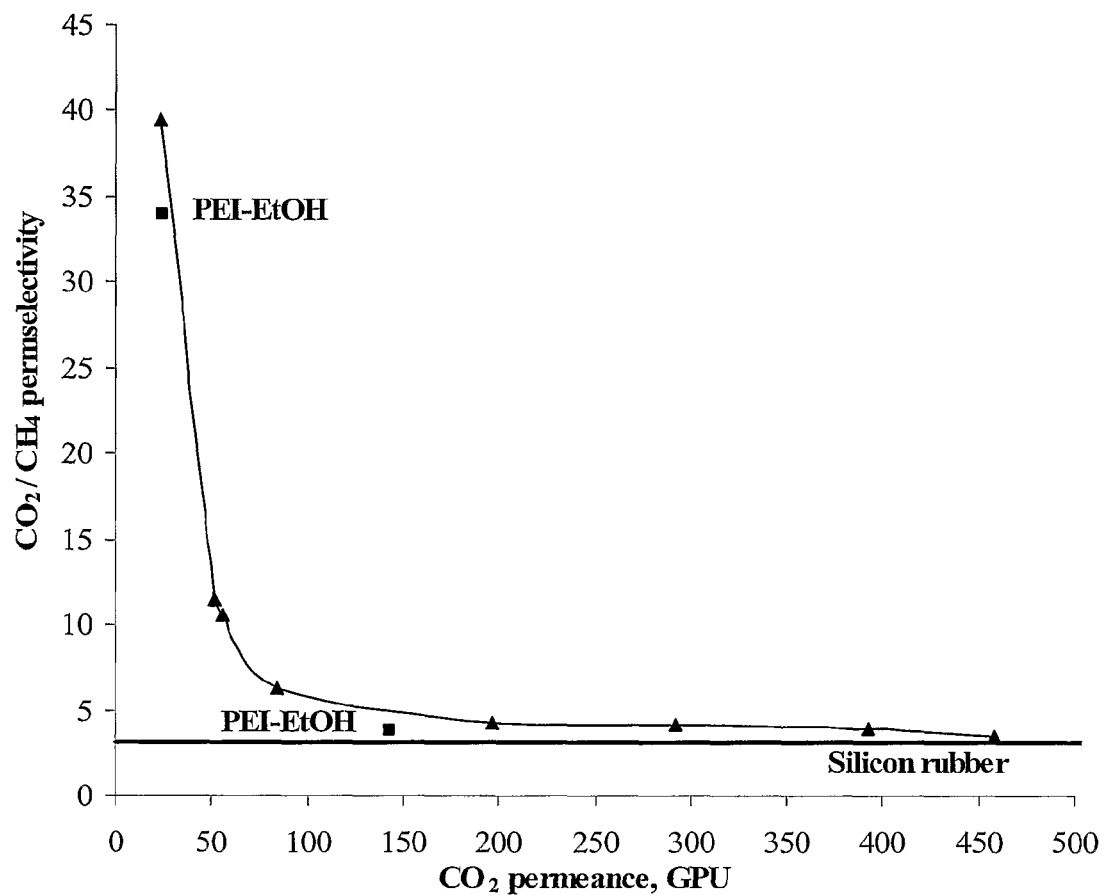
FIG. 11 is a graph illustrating the trade-off curve plot of $CO_2$ permeance and $CO_2/CH_4$ permselectivity based on the permeation of pure gases, square markers are for PEI membranes without BMI.

Performance of semi-IPN PEI-BMI membranes were studied through the permeation of $CO_2$, $CH_4$ and their mixtures. The trade-off curve of $CO_2$ permeance and $CO_2/CH_4$ permselectivity based on permeation of pure gases is shown in FIG. 11. On one hand, It was possible to have a membrane with $CO_2$ permeance of 23.3 GPU and $CO_2/CH_4$ permselectivity of 39.5. On the other hand, a membrane with $CO_2$ permeance of 458 GPU and $CO_2/CH_4$ permselectivity of 3.5 was also obtained. There is a slight improvement in the performance of semi-IPN PEI-BMI membranes over PEI membranes without BMI (see FIG. 11). The permeation test for pure $CH_4$ was carried out before using pure $CO_2$ permeation test. It is worth noting that repeating the pure $CH_4$ permeation test immediately after using $CO_2$ produce the same results indicating that there is no $CO_2$ plasticization or dilation effects as discussed elsewhere [59].

Figure 12:
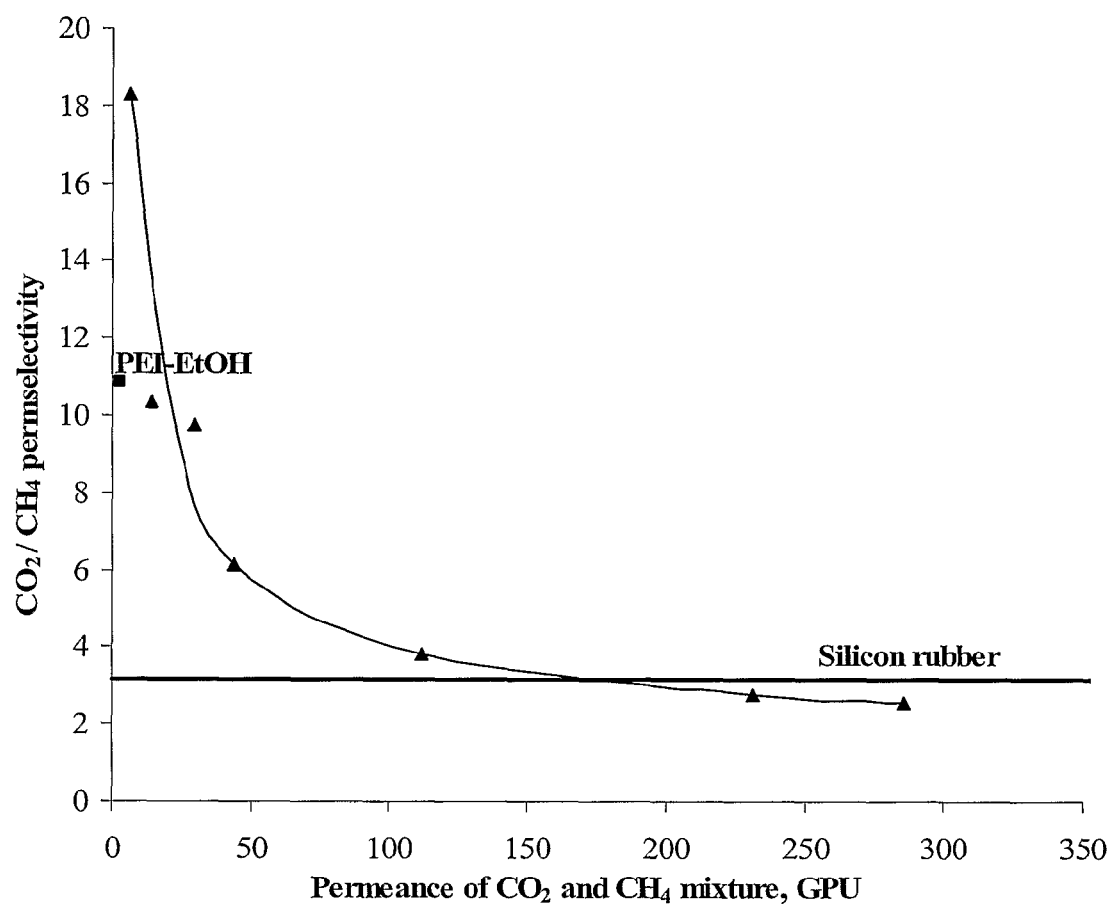
FIG. 12 is a graph illustrating the trade-off curve plot of permeance of the mixture of $CO_2$ and $CH_4$ versus $CO_2/CH_4$ permselectivity based on the permeation of gas mixture containing 26.5% (v/v) $CO_2$ and 73.5% (v/v) $CH_4$, square markers are for PEI membranes without BMI.

For permeation of $CO_2$ and $CH_4$ mixtures as shown in FIG. 12, it is clear that the observed gas permeance and $CO_2/CH_4$ permselectivity are lower than those determined by pure gas permeation test shown in FIG. 11. We observed a membrane with gas permeance of 6.3 GPU and $CO_2/CH_4$ permselectivity of 18.3 as well as another membrane with gas permeance of 286 GPU and $CO_2/CH_4$ permselectivity of 2.6. FIG. 12 shows a significant improvement in the performance of semi-IPN PEI-BMI membranes over PEI membranes without BMI based on gas mixture feed.

Case Study for $CO_2/CH_4$ Separation Using Four Semi-IPN-PEI-BMI Membranes

Figure 13:
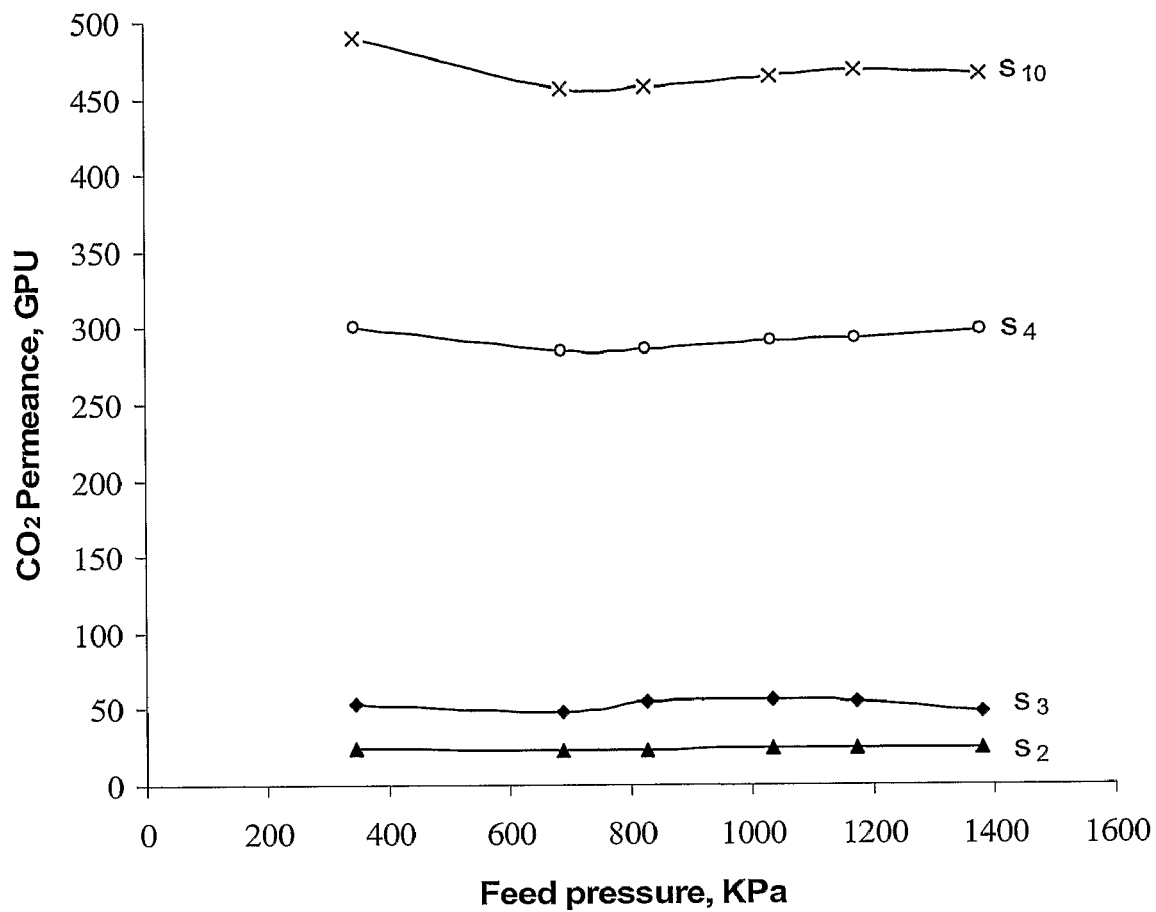
FIG. 13 is a graph illustrating the permeance of pure $CO_2$ at different feed pressure, the permeate gas was discharged to atmosphere.
Figure 14:
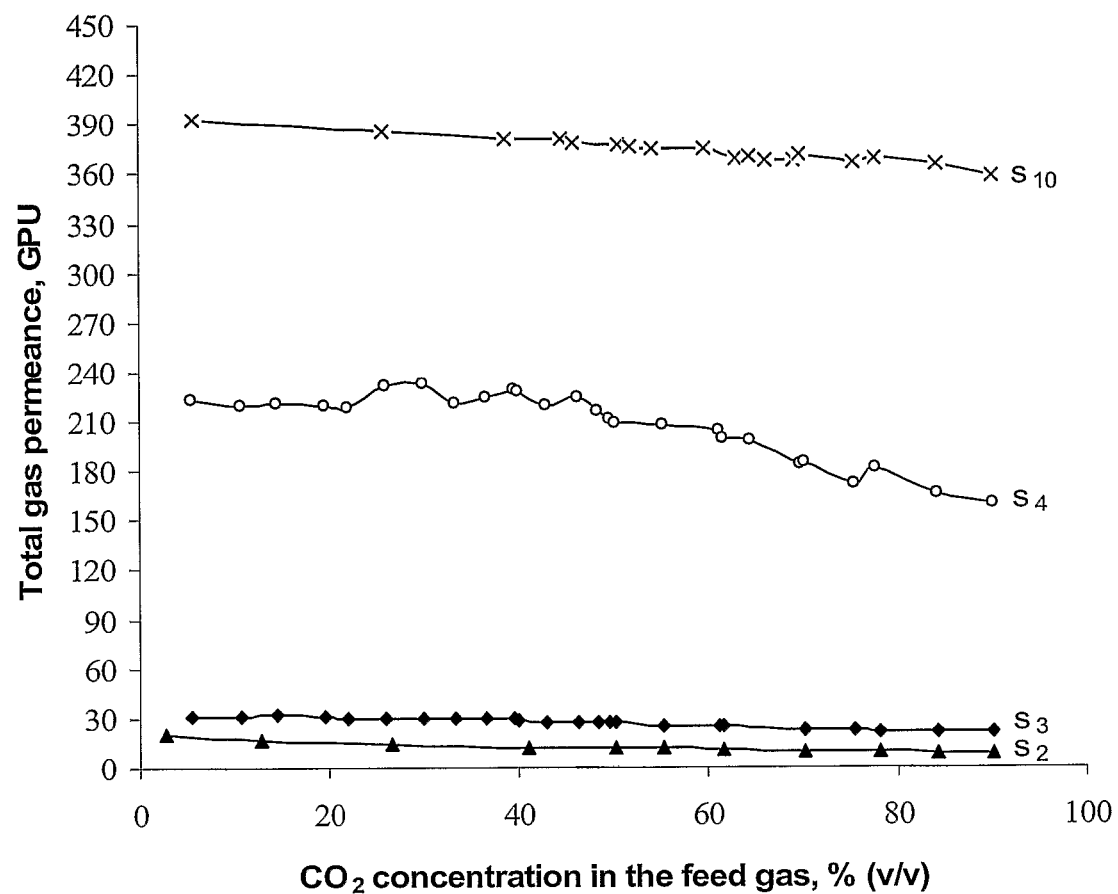
FIG. 14 is a graph illustrating the total gas permeance of $CO_2$ and $CH_4$ mixture at different feed concentration.

Four semi-IPN PEI-BMI membranes: $s_2$, $s_3$, $s_4$ and $s_{10}$ were selected. The subscript indicates the sample numbers shown in Table 5. The impact of pure $CO_2$ feed pressure on the plasticization of these membranes and the influence of $CO_2$ concentrations in the feed gas mixture on the membrane performance were investigated. Pure $CO_2$ permeance through these four membranes at different feed pressure are shown in FIG. 13. It is clear that there was no decrease in the $CO_2$ permeance up to pressures of 1400 kPa. Therefore, we might say that the increase in the pressure up to 1400 KPa has no influence on the plasticization of these membranes while plasticization of thin-film glassy polymers has been discussed elsewhere [60]. However, when a mixture of $CO_2$ and $CH_4$ is used, the gas permeance decreases slightly with the increase in the $CO_2$ concentrations in the feed gas mixture as shown in FIG. 14. The decrease in $CO_2$ permeance by increasing $CO_2$ concentrations in the feed gas mixture was also observed by others [61-63]. As the feed pressure is constant at 120 psig (kPa) the slight decrease in the permeance might be attributed to the $CO_2$ adsorption coverage as illustrated elsewhere [61].

Figure 15:
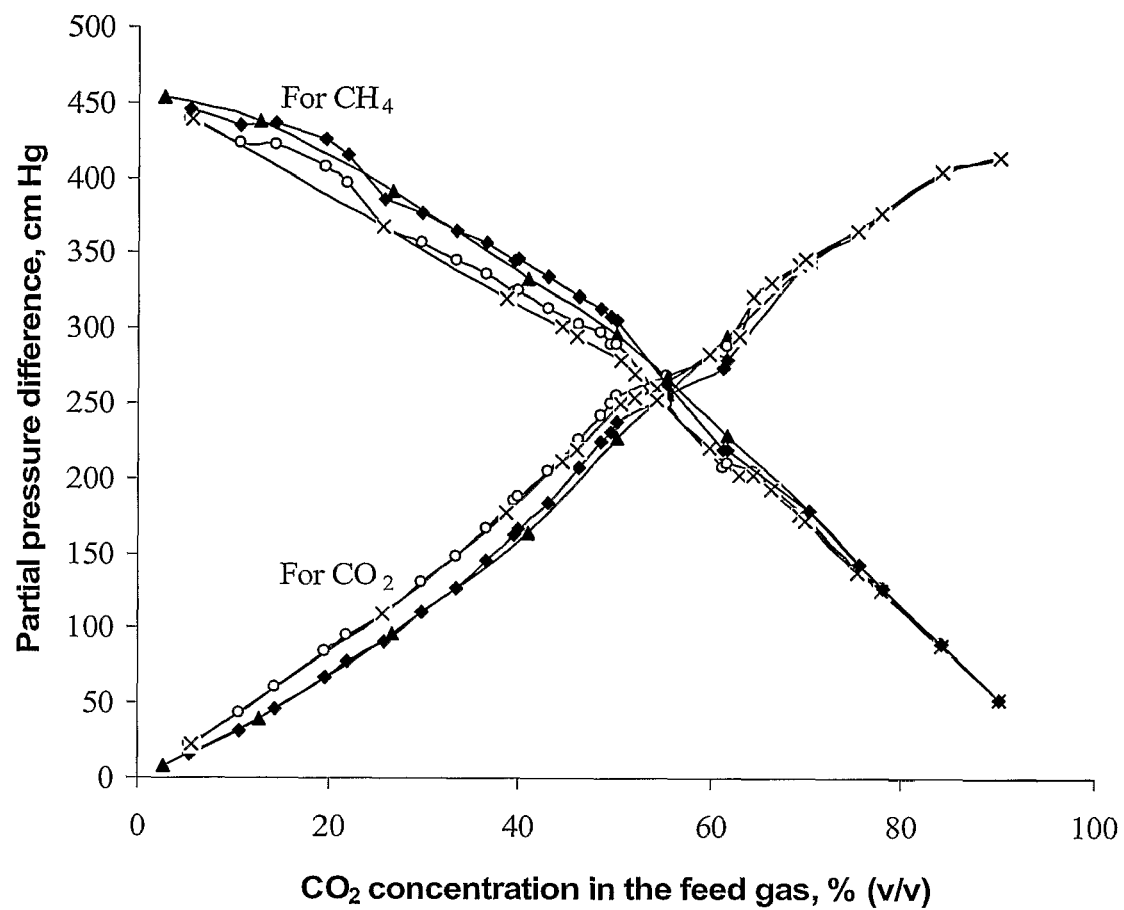
FIG. 15 is a graph illustrating the partial pressure differences for $CO_2$ and $CH_4$ at different feed concentration.

The driving force for permeation of a certain gas in a mixture through a membrane is usually represented by the difference in the partial pressure of this gas between permeate and feed sides. FIG. 15 shows that with the increase in the $CO_2$ feed concentration, the partial pressure differences increases for $CO_2$ while decreases for $CH_4$. All four semi-IPN PEI-BMI membranes have approximately the same linear correlation between the $CO_2$ feed concentration and the permeation driving force. On one hand, the advantage of increasing the permeation driving force of $CO_2$ is the increase in the productivity of $CO_2$ in the permeate stream and on the other hand, decreasing the permeation driving force of $CH_4$ leads to a decrease in the permeation rate of $CH_4$ and therefore improved $CO_2/CH_4$ permselectivity. The phenomenon of increasing the productivity of the more permeable gas (i.e. $CO_2$) upon increasing its driving force through the membrane was reported elsewhere [64]; however they did not refer to the simultaneous change in the driving force of other gases in the mixture. It is worth noting that the driving forces for $CO_2$ and $CH_4$ become equal when the concentration in the feed mixture is around 55% (v/v) of $CO_2$ gas. Therefore, a 50% concentration of each gas in a binary mixture does not necessarily lead to equal driving forces for both gases. Also at $CO_2$ feed concentration lower than 55% (v/v), the higher driving force for $CH_4$ than that for $CO_2$ does not lead to the faster permeation of $CH_4$ through the membrane that is always selective for $CO_2$ over $CH_4$.

Figure 16:
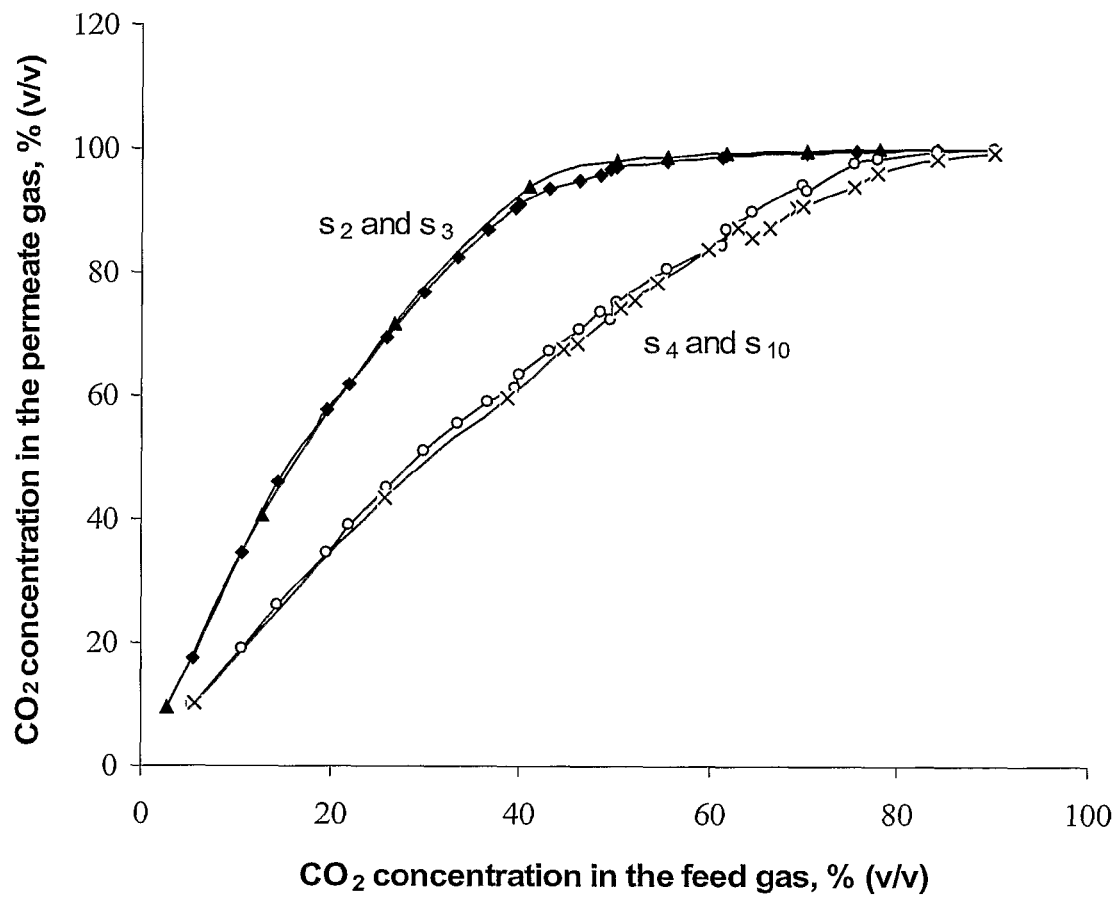
FIG. 16 is a graph illustrating the $CO_2$ concentration of permeate gas mixture of $CO_2$ and $CH_4$ when different feed concentrations are used.

The influence of $CO_2$ feed concentration in $CO_2$ and $CH_4$ mixture on the permeate composition is illustrated in FIG. 16. With increasing $CO_2$ feed concentration, the rate of increase of $CO_2$ concentration in the permeate is higher for $s_2$ and $s_3$ membranes and their curve starts to plateau at $CO_2$ feed concentration of greater than 40% (v/v) compare to $s_4$ and $s_{10}$ membranes that have lower rate and their curve starts to plateau at $CO_2$ feed concentration of greater than 80% (v/v). This plateau in curves means that the partial pressure of gases in the permeate side becomes approximately constant while there is still room to increase the partial pressure of $CO_2$ and decrease the partial pressure of $CH_4$ on the feed side. For this reason, the plateau of the partial pressure differences for both $CO_2$ and $CH_4$ mixture shown in FIG. 15 does not occur at the same $CO_2$ feed concentrations (for plateau shown in FIG. 16) but at higher than 85% (v/v) concentration.

Figure 17:
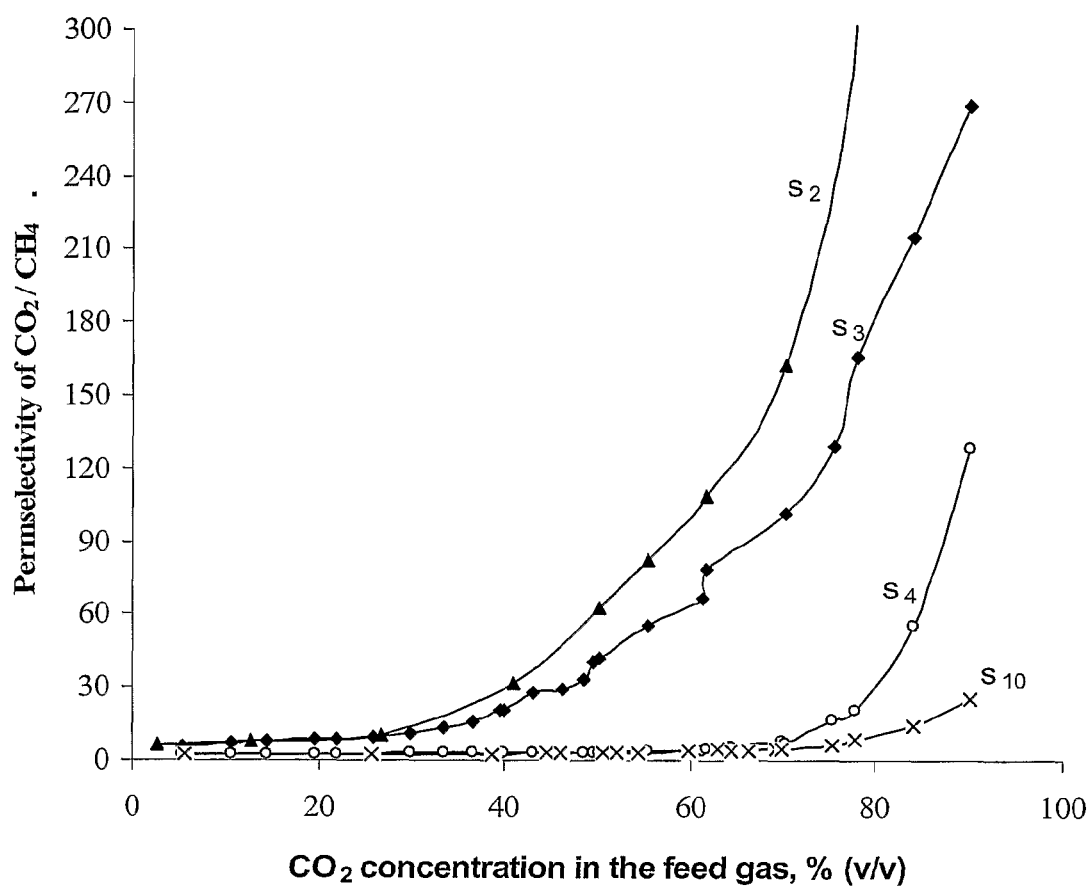
FIG. 17 is a graph illustrating the permselectivity of $CO_2$ concentrations in the feed side.

The influence of $CO_2$ feed concentration on $CO_2/CH_4$ permselectivity for a mixture is illustrated in FIG. 17. It is clear that the $CO_2/CH_4$ permselectivity starts to increase significantly at $CO_2$ feed concentration of greater than 40% (v/v) for $s_2$ and $s_3$ membranes and at concentration of greater than 80% (v/v) for $s_4$ and $s_{10}$ membranes. These concentrations are the same where the plateau starts as shown in FIG. 16. The increase in the $CO_2/CH_4$ permselectivity is attributed to the increase in the permeation driving force of $CO_2$ and the decrease in the driving force of $CH_4$ through the membranes. The phenomenon of increasing the permselectivity upon increasing the concentration of more permeable gas (i.e. $CO_2$) in the feed side was also observed and discussed elsewhere [65-66].

Figure 18:
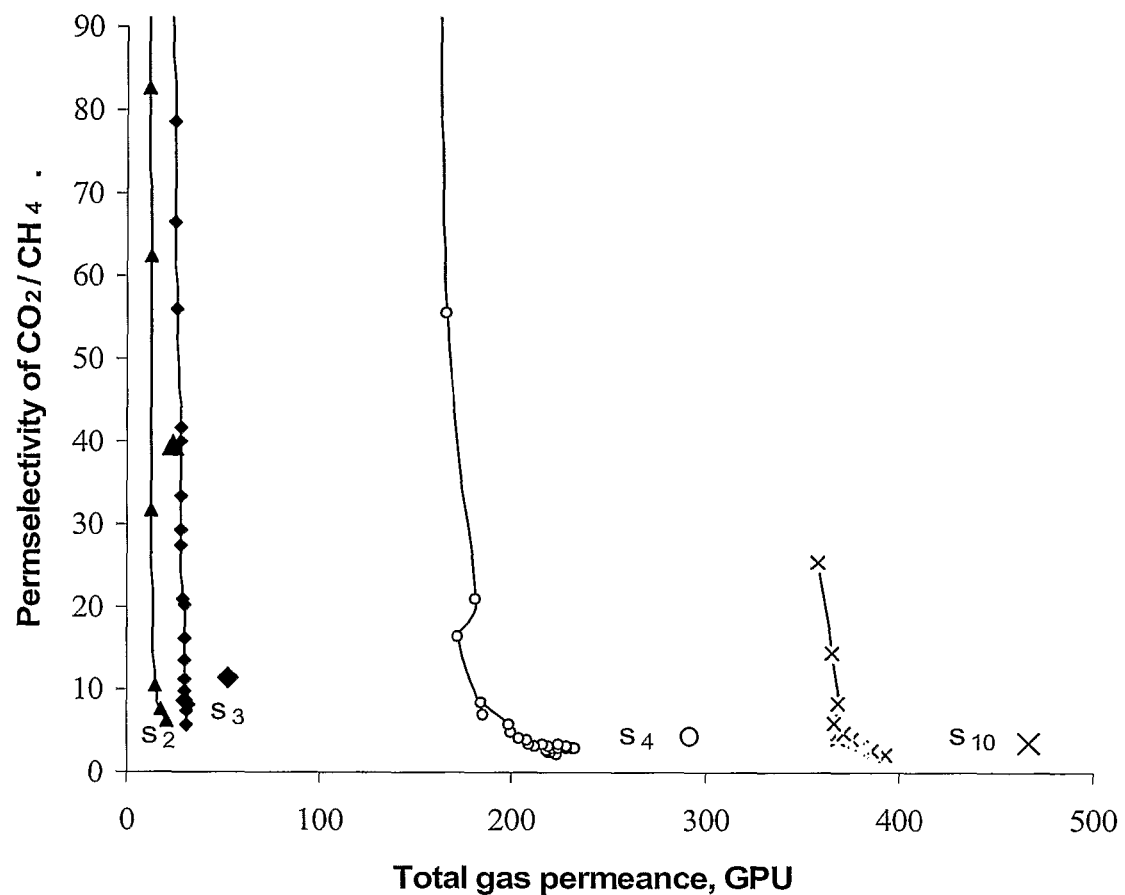
FIG. 18 is a graph illustrating the permselectivity of $CO_2$ over $CH_4$ versus gas permeance at different $CO_2$ concentrations in the feed side.

The $CO_2/CH_4$ permselectivity and permeance of $CO_2$ and $CH_4$ mixture was plotted in FIG. 18. Larger markers represent the values that are determined from permeation of pure gases. For $s_2$ and $s_3$ membranes, there is no significant change in the gas permeance while the $CO_2/CH_4$ permselectivity increase with increasing $CO_2$ feed concentration. Permeation data of pure gases show a higher permeance and $CO_2/CH_4$ permselectivity than those observed for $CO_2$ and $CH_4$ mixture at lower $CO_2$ feed concentrations (less than 40% (v/v). For $s_4$ and $s_{10}$ membranes, the gas permeance decrease with increasing $CO_2$ feed concentration and then becomes constant. Permeation data of pure gases show greater permeance than those observed for $CO_2$ and $CH_4$ mixture with a difference greater than that for $s_2$ and $s_3$ membranes. The $CO_2/CH_4$ permselectivity starts to increase significantly at a higher $CO_2$ feed concentration for $s_4$ and $s_{10}$ membranes compared to $s_2$ and $s_3$ membranes. These results confirm that the change in $CO_2$ feed concentration has greater influence on the $CO_2/CH_4$ permselectivity for $s_2$ and $s_3$ membranes than those for $s_4$ and $s_{10}$ membranes while it has a greater influence on the gas permeance for $s_4$ and $s_{10}$ membranes than those for $s_2$ and $s_3$ membranes. Dhingra (1997) [62] in his thesis reported that the change in $CO_2$ feed concentration in $CO_2$ and $CH_4$ mixture has an influence on gas transport characteristics for glassy polymers but not for rubbery polymers [62]. Although $s_4$ and $s_{10}$ membranes is controlled by the gas transport characteristics of silicon rubber, the performance of these membranes is not independent of $CO_2$ feed concentration as supposed to be based on Dhingra (1997) observations [62]. It appears that the behavior of silicon rubber as an ultra-thin film or when it is inside a confined space (nanoscale free volume in the glassy polymer) is different from the behavior of thick film of silicon rubber.

$CO_2/N_2$ Separation

Figure 19:
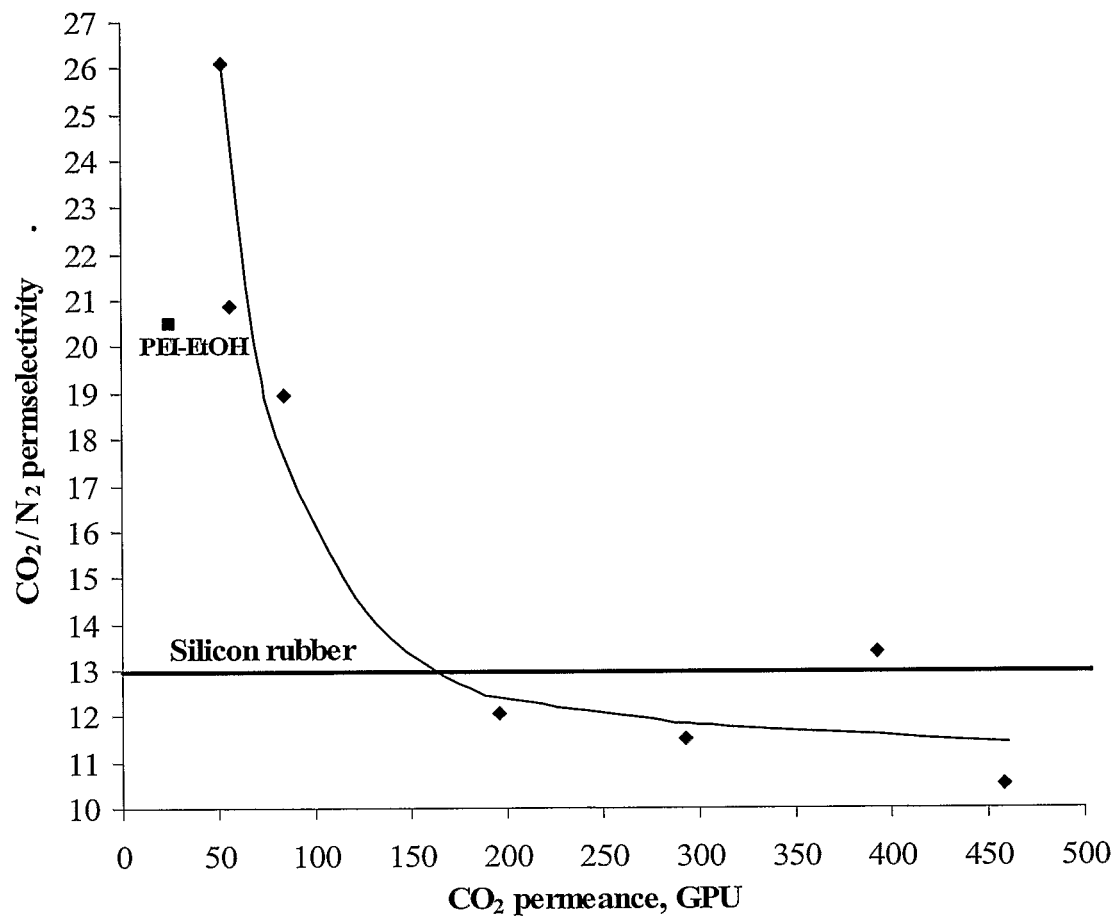
FIG. 19 is a graph illustrating the trade-off curve plot of $CO_2$ permeance and $CO_2/N_2$ permselectivity based on the permeation of pure gases, square marker is fro PEI membranes without BMI.

The trade-off curve of $CO_2$ permeance versus $CO_2/N_2$ permselectivity based on permeation of pure gases is shown in FIG. 19. The observations in FIG. 19 are similar to that found in FIG. 11 for $CO_2/CH_4$ separation. By selecting suitable membrane preparation procedures and conditions, it is possible to have a semi-IPN PEI-BMI membrane with $CO_2$ permeance of 52 GPU and $CO_2/N_2$ ideal permselectivity of 26 or a membrane with $CO_2$ permeance of 392.7 GPU and $CO_2/N_2$ ideal permselectivity of 13.4. It is clear that there is a significant increase in gas permeance through semi-IPN PEI-BMI membranes compared to PEI membrane without BMI. The silicon rubber shows an ideal $CO_2/N_2$ permselectivity of 12.96 as found elsewhere (Robeson, 1999-549-552)[67]. Therefore decreasing the gas transport resistance of the supported membrane and avoiding large defects could greatly improve the membrane productivity at this $CO_2/N_2$ permselectivity for silicon rubber (i.e. 12.96).

Figure 20:
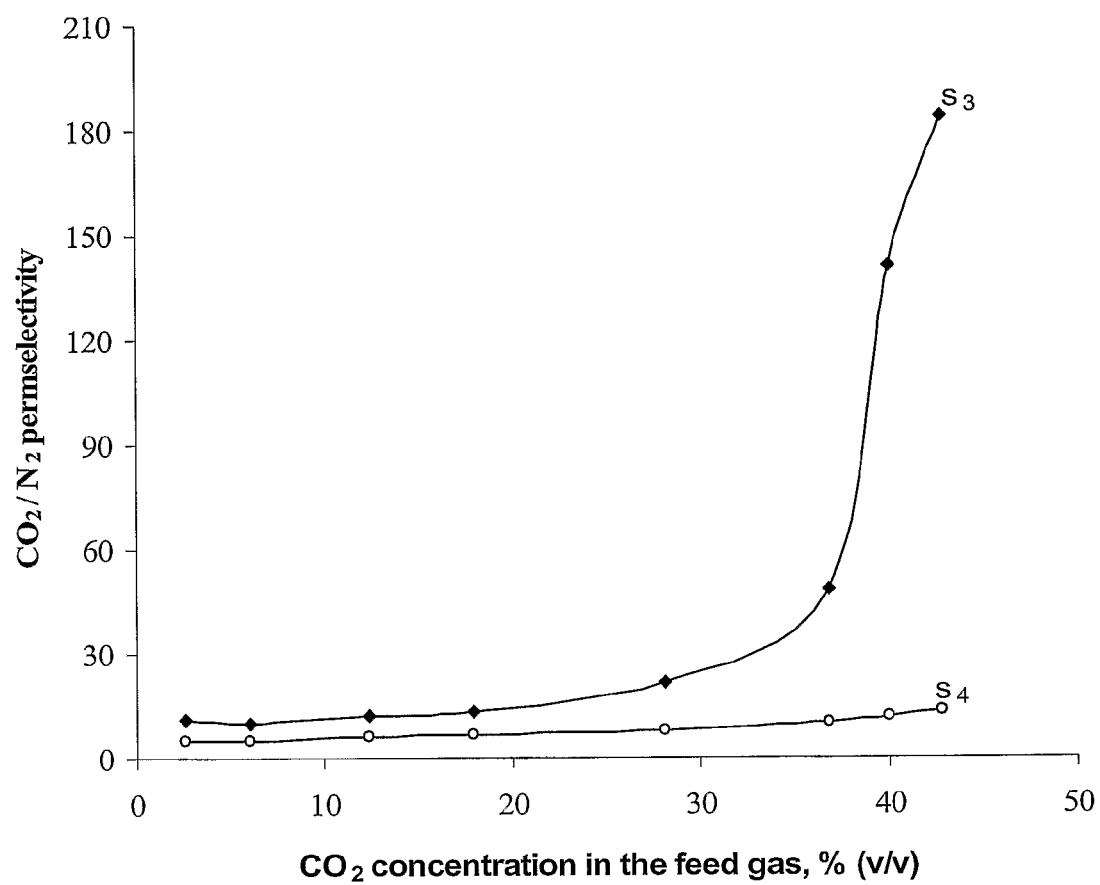
FIG. 20 is a graph illustrating the permselectivity of $CO_2$ over $N_2$ at different $CO_2$ concentrations in the feed side.

FIG. 20 shows the influence of $CO_2$ feed concentration in $CO_2$ and $N_2$ mixture on the $CO_2/N_2$ permselectivity for $s_3$ and $s_4$ membranes. We also observed the same behavior as that shown in FIG. 17 for separation of $CO_2$ and $CH_4$ mixture. Therefore, the same discussions might also be applied.

Figure 21:
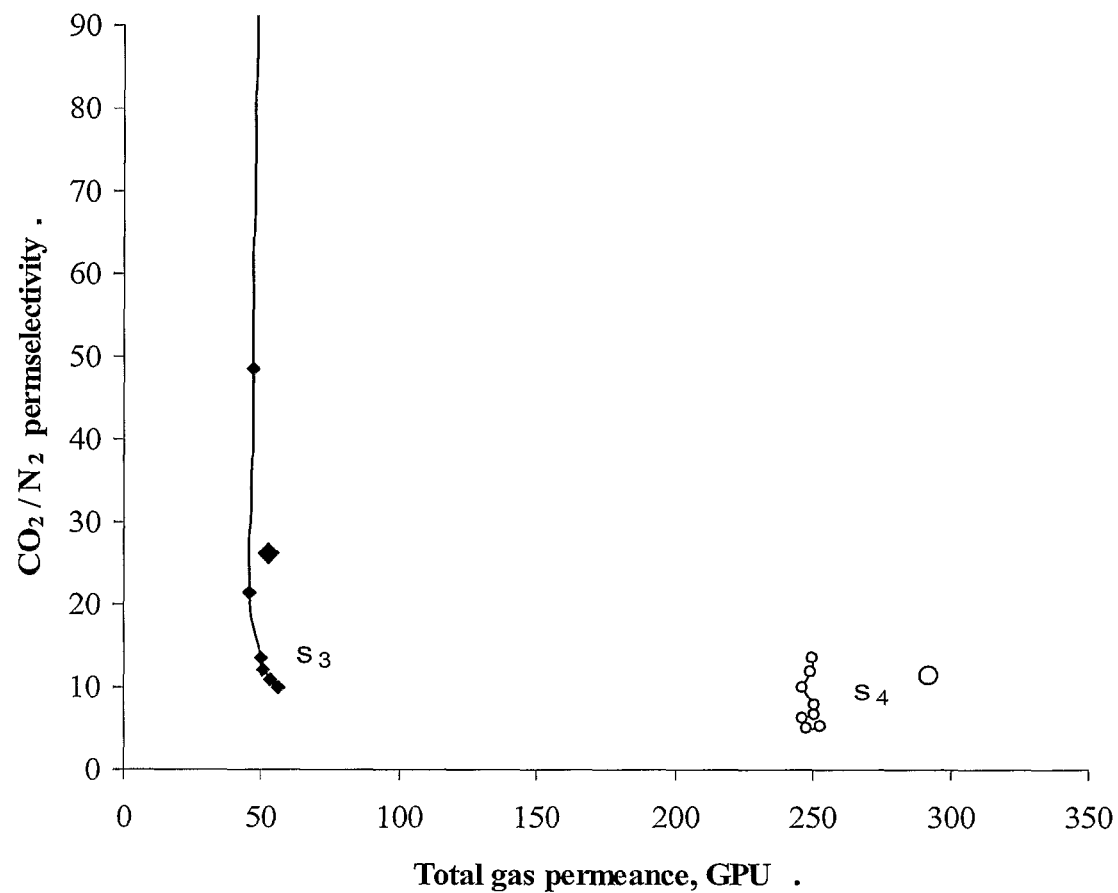
FIG. 21 is a graph illustrating the permselectivity of $CO_2$ over $N_2$ at different $CO_2$ concentrations in the feed side.

The performance of $s_3$ and $s_4$ membranes for separation $CO_2$ and $N_2$ mixture is shown in FIG. 21. The same behavior and discussion might be applied for these two membranes. However, $s_4$ membrane does not show a decrease in the gas permeance at low $CO_2$ feed concentration when $CH_4$ is used instead of $N_2$ (see FIG. 18). This might be due to different interactions of $CH_4$ with membrane materials or with $CO_2$ compared to $N_2$ gas. The increase of $CO_2/N_2$ or $CO_2/CH_4$ permselectivity with increasing $CO_2$ feed concentration has a great economic benefit as it is possible to arrange the separation process at different stages where the higher permselectivity can be exploited to achieve an improved overall efficiency. The arrangement of separation processes becomes more flexible and efficient with having two types of membranes such as high permeable $s_4$ and $s_{10}$ membranes and high permselective $s_2$ and $s_3$ membranes. It is clear that these membranes show promising results to separate $CO_2$ from natural gas or flue gas as an important step to control the emission of greenhouse gases.

Polysulfone/BMI Membrane Gas Separation

Solution Preparation:

Polysulfone (Udel™ 1700 LED) (17.6 parts) was completely dissolved in NMP solvent (67.2 parts) by rolling the bottle of each sample slowly then, anhydrous EtOH (13.3 parts) was added with slow mixing until a homogenous solution was obtained. BMI powder (1.9 parts) was added. We keep mixing at ambient conditions until a dark red color is arrived. It is also possible to reduce the mixing time by increasing temperature to higher than ambient, for example 60° C.

Membrane Preparation:

Membranes were cast at room temperature on clean glass plates placed in a glove box equipped with a gas filter. After casting each sample with a doctor knife having a gap of 250 μm, the plate was quickly immersed in distilled water at ambient temperature. The membrane films were left in water for three days then washed and stored in anhydrous EtOH bath for one day. Membranes were subsequently placed in hexanes for one day before leaving them in a fume hood for one day. Drying was carried out at 80° C. in air-purging convection oven for one day and finally in vacuum oven at 80° C. and 96.7 kPa (725 mm Hg) for two days. Three circular coupons of $7.4 \times 10^{-2}$ m diameter were cut from each sample to be used in the permeation test while other pieces were cut from the same sample for SEM characterization.

Membranes used in the permeation test were coated with silicon rubber. A solution of 3% Sylgard 184 with a vendor suggested catalyst to base rubber ratio of 1:10 in n-pentane was sprayed as a thin layer on the top surface of the membrane and the solvent was allowed to evaporate. Application of less than four coatings was found to be adequate for making gas separation membranes. Finally, the silicon coated membranes were cured in air purging convection oven at 80° C. for one day.

Permeation Test (Evaluation of Properties of Membrane):

A cross-flow test cell having a permeation surface area of 9.6 $cm^2$ was used. Pure $O_2$, $N_2$ and medical air were used to study $O_2/N_2$ separation. Pure $CH_4$, $CO_2$, $N_2$ and their mixture were used to study $CO_2/CH_4$ and $CO_2/N_2$ separations. Feed pressure of 665 kPa gauge (498.8 cm Hg) was used and the retentate was set at a flow rate of $6.6 \times 10^{-6}$ $m^3$ (STP).$s^{-1}$ while permeate was discharged to atmosphere. The permeate flow rate was measured by a soap bubble flow meter while for mixtures $O_2$, $CH_4$ and $CO_2$ concentrations of feed and permeate gas mixtures were determined by gas chromatography.

Gas Transport Characteristics of Membrane Prepared as in Example 1:

| $O_2$-enriched air Permeance GPU | Oxygen Permeance GPU | permselectivity $O_2/N_2$ |
|---|---|---|
| 5.53 | 366 | 1.6 |

Accordingly, we have prepared semi-IPN PEI-BMI and polysulfone/BMI membranes that have a higher performance for gas separations than PEI membranes. Membrane morphology for the skin and the supported layer is greatly influenced by these procedures and conditions that usually lead to different distributions of the free volume in the produced membranes at scales ranging from molecular dimensions to micrometer. Regardless of membrane materials, changing membrane morphology especially for the skin layer or the supported layer, it is possible to produce membranes with a high gas permeance but a low permselectivity or membranes with a high permselectivity but a low gas permeance. Using cast solution containing 19.5% (w/w) of PEI and BMI polymers, it was possible to decrease significantly the gas transport resistance of the supported membrane layer but it is difficult to obtain improved skin integrity that is responsible for high permselectivity. On the other hand, using cast solution containing 25% (w/w) or more of PEI and BMI polymers, it was possible to obtain improved skin integrity with a high permselectivity but the supported membrane layer becomes more resistant to gas transport. Using these two types of membranes, we are more flexible to arrange the separation processes into many stages to obtain a cost-efficient separation system.

The produced semi-IPN PEI-BMI membranes are not influenced by increasing the feed pressure of pure $CO_2$ up to 1400 kPa. However, $CO_2$ feed concentration has a significant influence on separation of $CO_2$ and $CH_4$ mixture or $CO_2$ and $N_2$ mixture. There is a slight decrease in the gas permeance with increasing $CO_2$ feed concentration. The driving force represented by the difference in the partial pressure for each gas in a binary mixture has approximately a linear correlation with $CO_2$ feed concentration. The driving forces of the two gases are not necessarily to be equal at 50% feed concentration. At low $CO_2$ feed concentration, the driving force for $CH_4$ is higher than that for $CO_2$ but the permeance of $CO_2$ is higher than the permeance of $CH_4$ that is always lead to a higher $CO_2$ concentration in the permeate side than that in the feed side.

Using our semi-IPN PEI-BMI membranes according to the invention, the increase of $CO_2/N_2$ or $CO_2/CH_4$ permselectivity with increasing $CO_2$ feed concentration might be economically exploited to arrange more cost-efficient separation systems for capture of $CO_2$ from natural gas or flue gas. It is also possible to use these membranes for production of $O_2$-enriched air or separation of various other gases.

REFERENCES

1. Baker W R. Ind Eng Chem Res 2002; 41(6):1393-1411.
2. Mison P, Sillion B. Adv Polym Sci 1999; 140:137-179.
3. Sperling L H. Interpenetrating Polymer Networks: An Overview. In: Klempner D, Sperling L H, Utracki L A, editors, Interpenetrating polymer networks, Washington, DC: American Chemical Society, Advances in Chemistry Series, No. 239, 1994, pp. 3-38.
4. Sperling L H, Mishra V. Polym Adv Technol 1996; 7:197-208.
5. Lodge T P. Macromol Chem Phys 2003; 204(2):265-273.
6. Kim S K, Kim S C. Polym bull 1990; 23:141-148.
7. Sommerfeld E G. U.S. Pat. No. 6,228,919 (2001).
8. Zhang H, Anazawa T, Watanabe Y, Miyajima M, Sommerfeld E G. U.S. Pat. No. 6,319,404 (2001).
9. Ho W S W, Sirker K K. Membrane Handbook, New York: Chapman and Hall, 1992.
10. Sourirajan S, Matsuura T. Reverse Osmosis/Ultrafiltration Process Principle, Ottawa: National Research Council, 1985.
11. Gaina V, Gaina C, Stoleriu A, Timpu D, Sava M, Rusu M. Polym.-Plast Technol Eng 1999; 38(5):927-938.
12. Kapantaidakis G C, Kaldis S P, Sakellaropoulos G P, Chiran E, Loppinet B, Floudas G. J Poly Sci, B: Poly Phys 1999; 37(19):2788-2798.
13. Giannotti M I, Solsona M S, Galante M J, Oyanguren P A. J Appl Polym Sci 2003; 89(2):405-412.
14. Liou H-C, Ho P S, Tung B. J Appl Polym Sci 1998; 70(2):261-272.
15. Griesbeck A G, Kramer W, Oelgemöller M. Synlett 1999; (7):1169-1178.
16. Wang D, Li K, Teo W K. J Membr Sci 1996; 115:85-108.
17. Wang X., Chen D, Ma W, Yang X, Lu L. J Appl Polym Sci 1999; 71(4):665-669.
18. Tawney P O, Snyder R H, Conger R P, Leibbrand K A, Stiteler C H, Williams A R. J Org Chem 1961; 26(1):15-21.
19. Stathatos E, Lianos P, Stangar U L, Orel B. Adv Mater 2002; 14(5):354-357.
20. Mhaske S B, Argade N P. Synthesis, J Synth Org Chem 2003; (6):863-870.
21. Major J S, Blanchard G J. Chem. Mater 2002; 14(6):2567-2573.
22. Smith B. Infrared spectral interpretation, a systematic approach. Boca Raton: CRC Press, 1999.
23. del Arco M, Carriazo D, Gutiérrez S, Martin C, Rives V. Phys Chem Chem Phy 2004; 6(2):465-470.
24. Musto P, Karasz F E, Macknight W J. Polymer 1989; 30(6):1012-1021.
25. Johnson C, Wunder S L. J Polym Sci, B: Polym Phys 1993; 31(6):677-692.
26. Xu H, Kuo S-W, Huang C-F, Chang F-C. J Polym Res 2002; 9(4):239-244.
27. Tai X S, Yin X H, Tanl M Y. Polish J Chem 2003; 77:411-414.
28. Stoyanov E S. Phys Chem Chem Phys 2000; 2(6):1137-1145.
29. Lin-Vien D, Colthup N B, Fateley W G, Grasselli J G. The Handbook of Infrared and Raman Characteristic Frequencies of Organic Molecules. Boston: Academic Press Inc, 1991.
30. Thomas R R, Buchwalter S L, Buchwalter L P, Chao T H. Macromolecules 1992; 25(18):4559-4568.
31. Shin T J, Ree M. Macromol Chem Phys 2002; 203(5-6):791-800.
32. Burrell M C, Chera J J. Surface Science Spectra 1999; 6(1):18-22.
33. Wolan J T, Hoflund G B. J Vac Sci Technol A 1999; 17(2):662-664.
34. Mikhailova S S, Mykhaylyk O M, Dorfman A M, Povstugar V I. Surf Interface Anal 2000; 29(8):519-523.
35. Yu W. Ko T-M. Eur Polym J 2001; 37(9):1791-1799.
36. Yam C-M, Pradier C-M, Salmain M, Marcus P, Jaouen G. J Colloid Interface Sci 2001; 235(1):183-189.
37. Lin Z, Strother T, Cai W, Cao X, Smith L M, Hamers R J. Langmuir 2002; 18(3):788-796.
38. Lindberg B, Berndtsson A, Nilsson R, Nyholm R, Exner O. Acta Chem Scand, A: Phys Inorg Chem 1978; 32(4):353-359.
39. Ma J, Zheng X, Schnappauf G, Braus G, Karplus M, Lipscomb W N. Proc Natl Acad Sci USA 1998; 95(25):14640-14645.
40. Vinnichenko M, Chevolleau T, Pham M T, Poperenko L, Maitz M F. Appl Surf Sci 2002; 201(1-4):41-50.
41. Roth H J, Hundeshagen G. Arch Pharm (Weinheim) 1976; 309(1):58-62.
42. Torrecillas R, Baudry A, Dufay J, Mortaigne B. Polym Degrad Stab 1996; 54(2-3):267-274.
43. Huang X D, Bhangale S M, Moran P M, Yakovlev N L, Pan J. Polym Int 2003; 52(7):1064-1069.
44. Ghosh I, Konar J and Bhowmick A K, J Adhes Sci Technol 1997; 11(6):877-893.
45. Easwar S, Argade N P. Indian J Chem, B: Org Chem Med Chem 2002; 41B(9):1899-1902.
46. Ding Y, Bikson B, Nelson J K. U.S. Pat. No. 6,790,263 (2004).
47. Henis J M S, Tripodi M K. U.S. Pat. No. 4,230,463 (1980).
48. Nelson J K, Bikson B, Macheras J T. U.S. Pat. No. 6,540,813 (2003).
49. Kurdi, J. and A. Kumar, Structuring and characterization of a novel highly microporous PEI/BMI semi-interpenetrating polymer network, Polymer, 46, 6910-6922, 2005.
50. Kurdi, J. and A. Kumar, Synthesis and characterization of modified bismaleimide-polysulfone semi-interpenetrating polymer networks, J. Appl. Polym. Sci., 2006, in press.
51. Kurdi, J. and A. Kumar, Formation and thermal stability of BMI-based interpenetrating polymers for gas separation membranes, J. Membrane Sci., 2006, in press.
52. Wallace, D. W., C. Staudt-Bickel, W. J. Koros, Efficient development of effective hollow fiber membranes for gas separations from novel polymers, Journal of Membrane Science, on line (2005).
53. Ismail A. F. and A. R. Hassan, Formation and characterization of asymmetric nanofiltration membrane: Effect of shear rate and polymer concentration, Journal of Membrane Science 270 (2006), 57-72.
54. Qina, J.-J., T.-S. Chunga, C. Caoc, R. H. Vora, Effect of temperature on intrinsic permeation properties of 6FDA-Durene/1,3-phenylenediamine (mPDA) copolyimide and fabrication of its hollow fiber membranes for CO2/CH4 separation, Journal of Membrane Science 250 (2005), 95-103.
55. Ruaan, R.-C., T. Chang, D.-M. Wang, Selection Criteria for Solvent and Coagulation Medium in View of Macrovoid Formation in the Wet Phase Inversion Process, J Polym Sci B: Polym Phys, 37 (1999), 1495-1502.
56. D. Silvestri, D., N. Barbani, G. Ciardelli, C. Cristallini, P. Giusti, Designing porous bioartificial membranes for clinical use with desired morphological and transport properties by phase inversion control, Journal of Applied Biomaterials & Biomechanics 2005; Vol. 3 no. 2: 83-92.
57. Ismail, A. F., Norida, R., and Sunarti, A. R, Latest development on the membrane formation for gas separation, Songklanakarin J. Sci. Technol., 2002, 24(Suppl.): 1025-1043 Ismail et al. 2002-1025-1043.
58. Ren, J., T.-S. Chung, D. Li, R. Wang and Y. Liu, Development of asymmetric 6FDA-2,6 DAT hollow fiber membranes for CO2/CH4 separation: 1. The influence of dope composition and rheology on membrane morphology and separation performance, Journal of Membrane Science 207 (2002) 227-240.
59. Visser, T., G. H. Koops and M. Wessling, On the subtle balance between competitive sorption and plasticization effects in asymmetric hollow fiber gas separation membranes, Journal of Membrane Science 252 (2005) 265-277.
60. Wessling, M., M. L. Lopez and H. Strathmann, Accelerated plasticization of thin-film composite membranes used in gas separation, Separation and Purification Technology 24 (2001) 223-233.
61. Li, S., J. G. Martinek, J. L. Falconer, R. D. Noble and T. Q. Gardner, High-Pressure CO2/CH4 Separation Using SAPO-34 Membranes, Ind. Eng. Chem. Res. 2005, 44, 3220-3228.
62. Dhingra, S. S., Mixed Gas Transport Study Through Polymeric Membranes: A Novel Technique, Faculty of the Virginia Polytechnic Institute and State University, Ph. D. Thesis (1997), page 146.
63. Xomeritakis et al. 2005-249-257
64. Ismail A. F. and N. Yaacob, Performance of treated and untreated asymmetric polysulfone hollow fiber membrane in series and cascade module configurations for CO2/CH4 gas separation system, Journal of Membrane Science, on line (2005).
65. van den Broeke, Leo J. P., Wridzer J. W. Bakker, Freek Kapteijn, and Jacob A. Moulijn, Binary Permeation through a Silicalite-1 Membrane, AIChE Journal, Vol. 45, No. 5, May 1999, 976-985.
66. Ogawa M. and Y. Nakano, Separation of CO2/CH4 mixture through carbonized membrane prepared by gel modification, Journal of Membrane Science 173 (2000) 123-132.
67. Robeson, L. M., Polymer membranes for gas separation, Current Opinion in Solid State and Materials Science 4 (1999) 549-552.

The invention claimed is:
1. A semi-interpenetrating polymer network(IPN), comprising a homogeneous blend of in situ polymerized BMI monomer within a glassy thermoplastic PEI polymer having an electron acceptor group, and having the structure

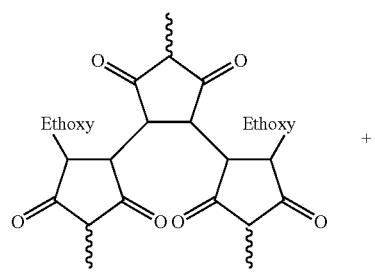

-continued

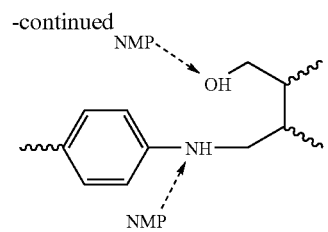

wherein ⁓⁓⁓ represents a connection to the rest of the molecule.

2. A polymer network according to claim 1, wherein the BMI to PEI weight ratio is from 0.1 to 25%.

3. A process for the preparation of a semi-interpenetrating polymer network(IPN), comprising a homogeneous blend of in situ polymerized BMI monomer within a glassy thermoplastic polymer having an electron acceptor group, the process comprising
(a) dissolving a BMI monomer and a glassy thermoplastic polymer having an electron acceptor group in a dipolar aprotic solvent and including ethyl alcohol, and
(b) in situ polymerizing the BMI monomer within the thermoplastic polymer at ambient temperature and pressure while mixing to provide a homogeneous solution, for a time sufficient to polymerize, but not so long as to result in phase separation of the BMI and thermoplastic polymers.

4. A process according to claim 3, wherein phase separation is indicated by formation of an opaque solution.

5. A process according to claim 4, wherein the thermoplastic polymer is PEI or polysulfone.

6. A process according to claim 5, wherein the thermoplastic polymer is PEI.

7. A process according to claim 5, wherein the reaction time is up to 80 days.

8. A process according to claim 6, wherein the reaction time is 11 to 24 days under ambient light.

9. A process according to claim 8, wherein the solvent is NMP.

10. A process according to claim 9, wherein ethyl alcohol is provided in an amount of ⅕ of the solvent weight.

11. A process according to claim 10, wherein the BMI to PEI weight ratio is 0.1 to 25%.

12. A process according to claim 11, which includes the additional step of casting the homogeneous polymer solution on a flat surface and immersing in water, before any phase separation takes place to provide a fine membrane surface structure having dispersed thermosetting polymer phase of less than 1 micron in diameter.

13. A process according to claim 12, wherein the homogeneous polymer solution contains 25-35%(w/w) of polymer.

14. A process according to claim 12, wherein the homogeneous polymer solution contains 19 to 19.5%(w/w) of polymer.

15. A gas separation membrane, cast from a homogeneous polymer solution containing a semi-interpenetrating polymer network(IPN) according to claim 1.

16. A membrane according to claim 15, for separation of $CO_2$ from a mixture of $CO_2$ and $CH_4$, or from a mixture of $CO_2$ and $N_2$.

17. A process for separation of $CO_2$ from a mixture of $CO_2$ and $CH_4$, or from a mixture of $CO_2$ and $N_2$, with a gas separation membrane according to claim 15, including increasing permselectivity of the membrane by increasing $CO_2$ feed concentration.

18. A polymer network according to claim 1, wherein the BMI to PEI weight ratio is 0.2 to 11%.

19. A process according to claim 11, wherein the BMI to PEI weight ratio is 0.2 to 11%.

20. A process according to claim 9, wherein the homogenous polymer solution contains 29% (w/w) of polymers.

* * * * *